US012709583B2

(12) United States Patent
McKnight et al.

(10) Patent No.: US 12,709,583 B2
(45) **Date of Patent: *Aug. 18, 2026**

(54) COMPOSITIONS AND METHODS FOR COATING OF NITRIFICATION INHIBITORS WITH A SOLUTION CONTAINING A HIGH CONCENTRATION OF UREASE INHIBITORS

(71) Applicant: World Source Enterprises, LLC, Charleston (KN)

(72) Inventors: Gary David McKnight, High Point, NC (US); Randall Linwood Rayborn, Burlington, NC (US); Charles J. Barber, Brandenton, FL (US); Wei Xu, Sugarland, TX (US)

(73) Assignee: SOILGENIC TECHNOLOGIES, LLC, High Point, NC (US)

( * ) Notice: Subject to any disclaimer, the term of this patent is extended or adjusted under 35 U.S.C. 154(b) by 955 days.

This patent is subject to a terminal disclaimer.

(21) Appl. No.: 17/682,311

(22) Filed: Feb. 28, 2022

(65) Prior Publication Data

US 2022/0242797 A1 Aug. 4, 2022

Related U.S. Application Data

(63) Continuation of application No. 15/898,126, filed on Feb. 15, 2018, now Pat. No. 11,352,303.

(60) Provisional application No. 62/459,364, filed on Feb. 15, 2017.

(51) Int. Cl.

| | |
|---|---|
| ***C05C 1/02*** | (2006.01) |
| ***A01N 63/20*** | (2020.01) |
| ***A01N 63/30*** | (2020.01) |
| ***A01N 63/40*** | (2020.01) |
| ***C05C 9/00*** | (2006.01) |
| ***C05F 11/08*** | (2006.01) |
| ***C05G 3/90*** | (2020.01) |
| ***C05G 5/30*** | (2020.01) |

(52) U.S. Cl.

CPC ................ *C05C 1/02* (2013.01); *A01N 63/20* (2020.01); *A01N 63/30* (2020.01); *A01N 63/40* (2020.01); *C05C 9/005* (2013.01); *C05F 11/08* (2013.01); *C05G 3/90* (2020.02); *C05G 5/30* (2020.02); *Y02P 60/21* (2015.11)

(58) Field of Classification Search

CPC ........... C05C 1/02; C05C 9/005; A01N 63/20; A01N 63/30; A01N 63/40; C05F 11/08; C05G 3/90; C05G 5/30; Y02P 60/21

See application file for complete search history.

(56) References Cited

U.S. PATENT DOCUMENTS

| | | | | |
|---|---|---|---|---|
| 4,234,332 | A | 11/1980 | Michaud et al. | |
| 4,530,714 | A | 7/1985 | Kolc et al. | |
| 5,024,689 | A | 6/1991 | Sutton et al. | |
| 5,352,265 | A | 10/1994 | Weston et al. | |
| 5,698,003 | A | 12/1997 | Omilinsky et al. | |
| 8,562,711 | B2 | 10/2013 | Sutton et al. | |
| 9,266,789 | B2 | 2/2016 | Ortiz-Suarez et al. | |
| 9,637,420 | B2 | 5/2017 | McKnight et al. | |
| 9,650,306 | B2 | 5/2017 | McKnight et al. | |
| 10,597,338 | B2 * | 3/2020 | Mcknight | C05G 5/00 |
| 11,001,537 | B2 * | 5/2021 | McKnight | C05C 9/00 |
| 11,198,653 | B2 * | 12/2021 | McKnight | C05C 9/005 |
| 11,312,667 | B2 * | 4/2022 | McKnight | C09K 15/18 |
| 11,352,303 | B2 * | 6/2022 | McKnight | A01N 63/40 |
| 12,116,325 | B2 * | 10/2024 | McKnight | C09K 15/28 |
| 12,139,443 | B2 * | 11/2024 | McKnight | C05C 9/00 |
| 12,497,344 | B2 * | 12/2025 | McKnight | C05C 9/00 |
| 2006/0185411 | A1 | 8/2006 | Hojjatie et al. | |
| 2007/0157689 | A1 | 7/2007 | Sutton et al. | |
| 2013/0283873 | A1 | 10/2013 | Sutton et al. | |
| 2014/0090432 | A1 | 4/2014 | McKnight et al. | |
| 2015/0143860 | A1 * | 5/2015 | McKnight | C05G 3/90 71/27 |
| 2015/0299062 | A1 * | 10/2015 | McKnight | C09K 15/30 252/406 |
| 2015/0315092 | A1 | 11/2015 | McKnight et al. | |
| 2018/0044254 | A1 | 2/2018 | Gabrielson | |
| 2019/0169081 | A1 | 6/2019 | McKnight et al. | |

FOREIGN PATENT DOCUMENTS

WO 2016070184 A1 5/2016

OTHER PUBLICATIONS

Macegonluk, K. et al., Bis(aminomethyl)phosphinic Acid, a Highly Promising Scaffold for the Development of Bacterial Urease Inhibitors, 2015, ACE Medicinal Chemistry Letters, vol. 6, pp. 146—150 (Year: 2015).

Zhu, J. CN105801320A, Slow-release fertilizer useful for cultivation of rice, comprises core composition containing urea and sodium silicate, and coating layer composition containing chitosan and diatomite, coated on surface of core composition, 2016, Derwent Abstract, 8 pages (Year: 2016).

Fu, L. CN103396239A, Slow-release fertilizer synergistic agent used for crops, comprises urease inhibitor, nitrification inhibitor, amine stabilizer, fertilizer synergist, and EDTA chelated mineral element, 2013, Derwent Abstract, 4 pages. (Year 2013).

Replace NMP [online]. Gaylord Chemical Company, LLC., 2021 [retrieved on Dec. 16, 2021]. Retrieved from the Internet: <URL:https://www.gaylordchemical.com/replace-nmp/>, pp. 1-7. (Year: 2021).

* cited by examiner

*Primary Examiner* — Ali Soroush
*Assistant Examiner* — Andriae M Holt
(74) *Attorney, Agent, or Firm* — Jason A. Smith; Shumaker, Loop & Kendrick, LLP

(57) ABSTRACT

A dry, flowable additive composition for combination with a fertilizer that increases longevity of plant available nitrogen from the fertilizer while in the soil.

19 Claims, 3 Drawing Sheets

COMPOSITIONS AND METHODS FOR COATING OF NITRIFICATION INHIBITORS WITH A SOLUTION CONTAINING A HIGH CONCENTRATION OF UREASE INHIBITORS

FIELD OF INVENTION

The present invention relates to increasing and/or maintaining nitrogen content in soil by administration of granular or powdered nitrification inhibitors coated with urease inhibitors. In one embodiment, urease inhibitors are dispersed in an improved organo liquid delivery system at concentration levels of 50-90%. In another embodiment, urease inhibitors were applied in a non-aqueous, organo liquid delivery system coating solid nitrification inhibitors utilizing simple blending equipment at temperatures of 20°-70° C. Another embodiment discloses a dry, flowable additive containing a nitrification inhibitor coated with a urease inhibitor which can be administered directly to the soil, to a dry natural and/or a manmade fertilizer or to a liquid fertilizer which provides for the reduction of nitrogen loss from the soil due to microbial activity.

BACKGROUND OF THE INVENTION

Nitrogen is an essential plant nutrient and is thought to be important for adequate and strong foliage. Urea provides a large nitrogen content and is the dominant nitrogen fertilizer. In the presence of soil moisture, natural or synthetic ureas are converted to ammonium ion, which is then available for plant uptake. Ammonium can be further converted by bacteria in soil to nitrate through a nitrification process. Nitrate is also available for plant uptake.

However, the urea usage efficiency is low. In one study used data from over 800 experiments, it is estimated that only 51% of the N applied was recovered by cereals plant (Dobermann and Cassman 2005). In another literature reference, it was reported that average urea efficiency in cereals in China was 30-35% (Fan 2004).

There are two routes for urea loss. One is ammonia ventilation. In practice, nitrogen fertilizer is often just applied once at the beginning of the growing season. The excessive ammonia from urea degradation by urease in the soil bacteria may be leached to environment, especially water or converted to ammonia gas, which is called ammonia ventilation. Soil property, including titratable acidity, pH-H2O, urease activity and cation-exchange capacity, contributes about 90% of ammonia ventilation (Watson CJ 1994). The other route is nitrification wherein ammonia is converted to nitrate by bacteria in the soil, which is called nitrification. Excessive nitrate can be converted into nitric oxide or nitrous oxide by certain types of bacteria in the soil, which is called denitrification.

Low efficiency of nitrogen fertilizer not only increases the cost of fertilization, but also contributes significantly to environment pollution. Ammonia has an obnoxious smell even at very low level and ammonium in the water is toxic to water creatures (US EPA822-R-13-001). Nitrous oxide is a potent greenhouse gas, whose potency on global warming is 300 times stronger than carbon dioxide (http://epa.gov/climatechange/ghgemissions/gases/n2o.html). So, increasing the efficiency of urea fertilizer will both save the money and protect the environment, which is very desirable. To improve the longevity of nitrogen nutrients in the soil, fertilizers have been treated with nitrification inhibitors and urease inhibitors. These inhibitors can be deposited onto the surface of fertilizer granules as a coating or added to liquid fertilizers which are aqueous solution of such nitrogen rich components as urea and ammonium nitrate (UAN).

UAN products are of particular interest since the nitrate portion is mobile in the soil and can move to roots for rapid nutrient uptake and the ammonium portion can complex with clay particles and be released as a nitrogen nutrient over time while the urea portion is dependent upon biological processes to degrade it into nitrogen compounds that are in a form that is absorbable by plants. The major advantage of such a compounded fertilizer is that it can provide quickly plant absorbable nitrogen nutrients and is also designed to provide nitrogen nutrients over time. They are marketed as UAN followed by a number indicating the % nitrogen contained in the formulation such as UAN 28 or UAN 32 with the number 28 and 32 denoting the nitrogen content.

However, UAN solutions also present challenges to economically maintain suitable levels of nitrogen nutrients over time during warmth of the growing season due to the high microbial populations in the soil fueling the decomposition of urea to ammonia and the oxidation of ammonia to nitrates and $NO_x$ at a rapid rate. Thus, finding economical delivery formulations that are safe for the environment and for animals and that contain the proper balance of nitrification inhibitors and urease inhibitors that may be applied directly to liquid fertilizers such as UAN would be advantageous to the agricultural industry. Such a treated liquid fertilizer would also assist in slowing two major biological processes that cause substantial loss of nitrogen in soil while simultaneously assisting in controlling pollution of our water and atmosphere. Some products on the market can achieve the goal, such as Neon series from EcoAgro Resources, in which NBPT and DCD are dissolved in organic solvents. However, such formulations are not the most economical way to achieve the delivery of urease and nitrification inhibitors to liquid fertilizers due to the high cost of the organic solvent, which is not necessary for UAN products, and the lower composition percentages of the inhibitors in the liquid formulations which necessitate a larger percentage application of these liquid dispersed systems.

Herein, is described an innovation in which the nitrification inhibitor crystals or powder is coated with a high concentration of urease inhibitor dissolved in an organic solvent. These urease inhibitor coated nitrification solids are ready to quickly dissolve in the UAN resulting in a clear and stable solution making it easy to insure a homogeneous solution for an even application of urease and nitrification inhibitors to the soil. Compared to its liquid equivalents, the current technology is inexpensive to make, transport and store, while delivering a higher concentration of inhibitors per weight unit of product.

DESCRIPTION OF THE RELATED ART

Of particular interest is increasing the length of time that nitrogen nutrients are available to plants from an aqueous urea/ammonium nitrate based liquid fertilizer (referred to herein as UAN). When applied to soil, the urea component of the UAN hydrolyzes to ammonia through the action of urease enzymes generated by numerous fungi and bacteria present in the soil while the ammonia generated by the urease action on urea and present in the ammonium nitrate can be oxidized to nitrates. While these conversion processes are necessary to create nitrogen nutrients in a plant available form, they occur at a rate too rapid to be absorbed by plants leading to the quick depletion of these nutrients either through volatilization or water runoff. The utilization of urease and nitrification inhibitors is required to slow both biological processes to extend the availability of nitrogen nutrients to plants.

Various methods as disclosed in the patents below, which are incorporated by reference in their entireties, have been proposed and developed for controlling nitrogen nutrients loses from soil treated with an aqueous solution of urea and ammonium nitrate.

Michaud (U.S. Pat. No. 4,234,332) describes aqueous solutions of commonly used fertilizers which also contain dicyandiamide, in an amount to provide at least 10% by weight of dicyandiamide nitrogen which is an effective nitrification inhibitor.

Sutton et al. (U.S. Pat. No. 5,024,689) teach the use of liquid fertilizer that includes urease inhibitors such as NBPT and nitrification inhibitor such as dicyandiamide (referred to herein as DCD) in aqueous mixtures of urea, ammonium polyphosphate, ammonium thiosulfate and potentially other plant growth improving compounds. This approach has drawbacks in that NBPT and DCD are not particular soluble in water especially water containing high salt contents.

Weston, et al (U.S. Pat. No. 5,352,265) discloses a granular urea based fertilizer in which NBPT in 25-50% of solvent selected from the group consisting of liquid amides, 2-pyrrolidone, and N-alkyl 2-pyrrolidones is blended directly into molten urea prior to its granulation. DCD may be added to the urea melt as a solid or in dissolved form along with the NBPT. This approach is equipment specific and is generally high in cost.

Omilinsky, et al (U.S. Pat. No. 5,698,003) Improved solvent systems for the formulation of N-alkyl thiophosphoric triamide urease inhibitors comprised of a solvent selected from the group consisting of glycols and glycol derivatives and optionally, the formulations can contain a co-solvent selected from the group consisting of liquid amides, 2-pyrrolidone and N-alkyl 2-pyrrolidones, and/or a nonionic surfactant. These solutions are to be applied onto solid urea containing fertilizers or added to liquid urea containing fertilizer formulations.

McKnight (U.S. Pat. Application Publication No 20140090432) discloses a solvent delivery system for the urease inhibitor that can be utilized as a coating or an additive to a liquid fertilizer. McKnight (U.S. Pat. Application Publication No 20150143860, 20150299062 and 20150315092) illustrate solvent delivery systems for urease and nitrification inhibitors for coating granular fertilizers or for adding to liquid fertilizers.

Ortiz-Suarez (U.S. Pat. No. 9,266,789) teaches of solvent delivery systems for Dicyandiamide, a nitrification inhibitor, to be utilized with UAN solutions or coated onto the surface of urea for increasing the life of plant available nitrogen nutrients.

While Omilinsk, McKnight and Ortiz-Suarez utilize organo solvents to dissolve the inhibitors, the utility of these types of technologies are not cost effective because the organo solvents are an added cost as they not necessary for aqueous fertilizers and the % inhibitors are too low for aqueous fertilizers thus requiring higher percent usage to meet inhibition requirements.

Sutton (U.S. Pat. No. 8,562,711, U.S. Pat. Application Publication No 2007157689 and 20130283873) provides a method for developing a dry, flowable additive for aqueous urea-based fertilizers based on solid urea formaldehyde polymer (referred to herein as UFP) coated with N-(n-butyl) thiophosphoric triamides either molten or in a solvent system as a dispersion or suspension for inhibition of urease enzyme and, optionally, dicyandiamide that imparts nitrification inhibition to reduce nitrogen loss from the soil. Also, Sutton provides that the dry additive may be blended with molten or solid urea to form a solid urea-based fertilizer with reduced nitrogen loss from the soil. This approach requires the pre coating of UFP granules with a solvent based NBPT and then blended with dry DCD which adds more cost to the final product. UFP's have poor solubility in water and especially in water containing high levels of salt. This lack of solubility requires that the UFP undergoes special process to insure that it's particle size be small enough to be suspended in an aqueous solution making the homogeneity of the application of the inhibitor package more difficult as the NBPT resides on the insoluble UFP particle. The resulting aqueous fertilizer containing a product of this technology is milky in appearance making it difficult to determine when a product of this technology has completely dissolved and the coated UFP settles out upon standing impacting the homogeneity of the resulting aqueous fertilizer resulting in uneven application of the inhibitors to the soil.

While many of these techniques have a positive impact of maintaining the level of nitrogen in the soil, they also have significant problems. Thus, there is a need for a composition, that is easy to dissolve resulting in a clear, stable solution in order to insure homogeneity of the inhibitors throughout the aqueous fertilizer and which can deliver the required levels of urease and nitrification inhibitors in an economically and homogeneous manner to plants and to the soil.

BRIEF SUMMARY OF THE INVENTION

Urea and ammonium nitrates are desirable starting materials for fertilizers and fertilizer additives, which can provide high nitrogen content and can be used in fertilizer products that provide phosphorus or potassium as primary nutrients, and calcium, magnesium, or sulfur as secondary nutrients or micronutrients such as boron, copper, iron, manganese, molybdenum and zinc. These fertilizer products deliver the nutrients to the soil and through numerous biological processes can be converted to forms that are capable of being absorbed by plants. The use of a nitrification inhibitor such as cyanoamides, typically, dicyandiamide (DCD) by itself or combined with a urease inhibitor such as phosphoramides are one embodiment of the invention. In an embodiment, the present invention relates to an additive that imparts to liquid or solid manmade fertilizer, manure, waste or compost an increased longevity of plant available nitrogen in the soil wherein the additive is a dry, flowable composition produced by coating nitrification inhibitor with a urease inhibitor dissolved in a Non-aqueous Organic Solvent Delivery System (NOSDS) at concentrations of urease inhibitors in the NOSDS of 50-90%. The resulting coated nitrification inhibitor becomes an additive that can be mixed with granular, natural or synthetic, fertilizer or added to aqueous fertilizer in particular combination of urea and ammonium nitrate that have been dissolved in water (commercial name of UAN). The inclusion of the combination of nitrification and urease inhibitors which will inhibit biological oxidation of ammonia by soil microbes, such as *Nitrosomonas* bacteria and inhibit the enzymatic action of urease slowing the conversion urea nitrogen to ammoniacal nitrogen.

The present invention provides for a composition that is easy to dissolve resulting in a clear, stable solution in order to insure homogeneity of the inhibitors throughout the aqueous fertilizer and which can deliver the required levels of urease and nitrification inhibitors in an economically and homogeneous manner to plants and to the soil.

DETAILED DESCRIPTION

Figure 1:
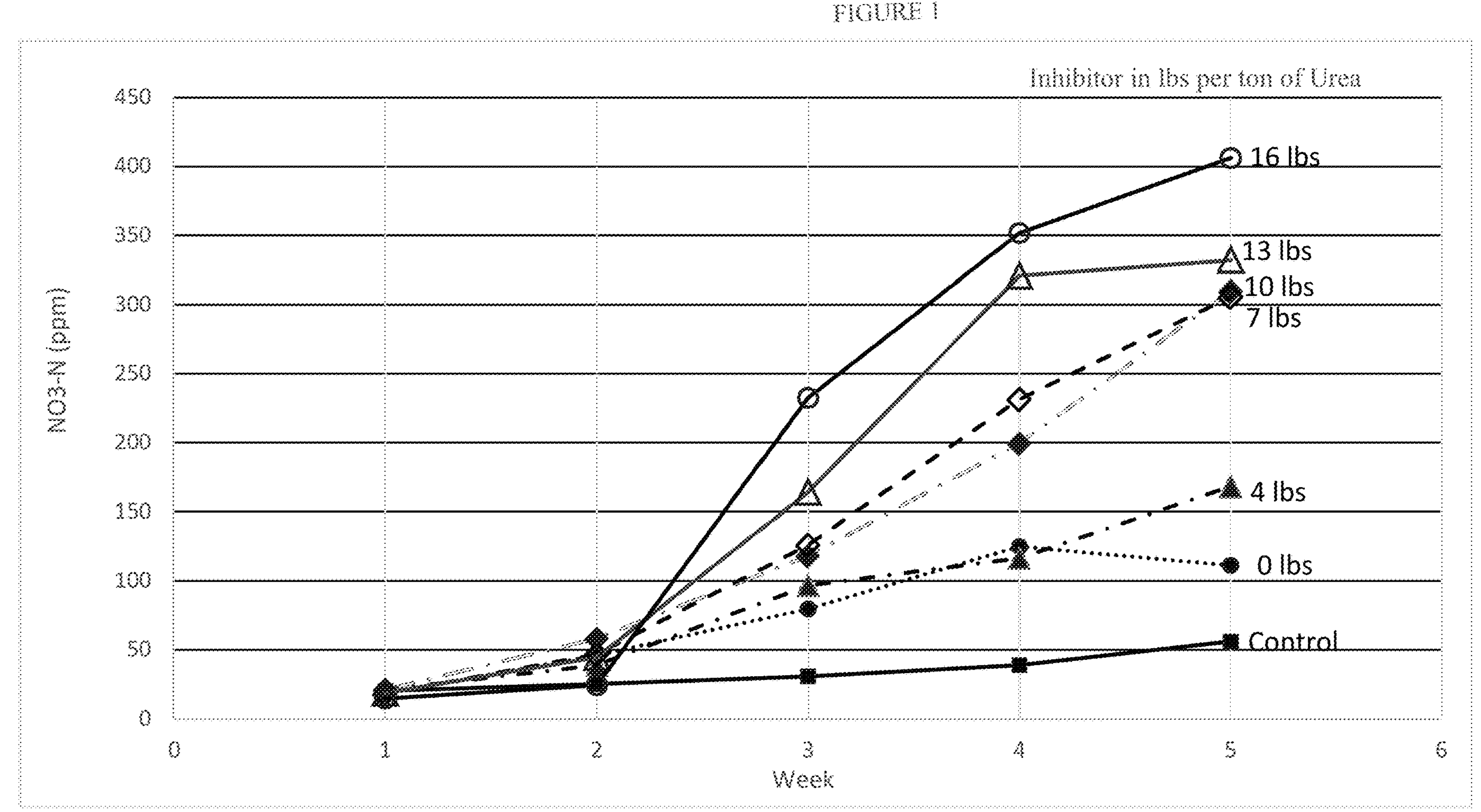
FIG. 1: Nitrate nitrogen concentration for soil samples with varying levels of liquid containing nitrification inhibitor (lbs per ton of urea) for one to five weeks post urea application, with soil moisture adjusted weekly to 80% field capacity.

The following words are given the meanings ascribed below.

Fertilizer, in this invention, is defined as any material of natural or synthetic origin that is applied to soils or to plant tissues (usually leaves) to supply one or more plant nutrients essential to the growth of plants in order to increase growth and productivity.

Aqueous Fertilizer, in this invention, is defined as any material of natural or synthetic origin that is dissolved in water to form a solution and then applied to soils or to plant tissues (usually leaves) to supply one or more plant nutrients essential to the growth of plants in order to increase plant growth and productivity. Of particular interest are aqueous solutions marketed as UAN.

UAN, in this invention, is an aqueous solution comprised of the fertilizer components of urea and ammonium nitrate commonly marketed as UAN followed by a number quantifying the % nitrogen present in the product. Example: UAN-30 indicates a composition containing 30% plant available nitrogen.

Protic solvent, in this invention, is a solvent containing a hydrogen atom bonded to an electronegative atom such as oxygen and nitrogen or any molecule which contains a dissociable $H^+$ (proton).

Polar protic solvent, in this invention, is a subset of polar solvent that have high dielectric constants and high polarity. In this invention polar protic solvents are included through the use of the term protic solvent(s).

Aprotic solvent, in this invention, is a solvent that neither accepts nor donates H+ (protons) and does not containing dissociable hydrogen.

(aminomethylene)phosphinic acids and bis-(aminomethylene)phosphinic acids, are general names given to a family of compounds containing a phosphinic acid and/or their salts and connected to an amine through a methylene linkage.

Polar aprotic solvent, in this invention, is a subset of aprotic solvents that have high dielectric constants and high polarity. In this invention polar aprotic solvents are included through the use of the term aprotic solvent(s).

In an embodiment, the present invention relates to an additive that imparts to liquid or solid manmade fertilizer, manure, waste or compost an increased longevity of plant available nitrogen in the soil wherein the additive is a dry, flowable composition created by coating nitrification inhibitors with urease inhibitors dissolved in NOSDS at concentrations of urease inhibitors of 50-90%. In a variation, nitrification inhibitors can be coated with urease inhibitors dissolved in a blend of polar aprotic and protic solvents. The resulting coated nitrification inhibitor can then be mixed with granular, natural or synthetic, fertilizer or added to fertilizer combination of urea and ammonium nitrate that has been dissolved in water (commercial name of UAN).

The combination of nitrification and urease inhibitors will inhibit biological oxidation of ammonia by soil microbes, such as *Nitrosomonas* bacteria and inhibit the enzymatic action of urease slowing the conversion urea nitrogen to ammoniacal nitrogen. In one embodiment, improved delivery formulations have been developed that deliver effective levels of urease inhibitors as a coating on nitrifications inhibitors that increase the plant available nitrogen longevity of UAN solutions and granular fertilizers when applied to soil. It has been found that the delivery formulations of the present invention provide a liquid vehicle to deliver an even, non-clumping application of the desired urease inhibitors to the nitrification inhibitor surfaces. These new delivery formulations for coating nitrification inhibitors are based on a Non-aqueous Organic Solvent Delivery System (NOSDS), which improve storage life of urease inhibitors such as alkyl thiophosphoric triamides over those formulations containing greater than 1% water. In fact, because of the present invention, one can now deliver the inhibition of the oxidation of ammonia to nitrates and the conversion of urea to ammonia in an additive that easily dissolves into a liquid fertilizer such as UAN, and as a dry additive for granular fertilize.

In one embodiment, the improved delivery systems of the present invention can be utilized as a vehicle to impart a coating of a urease inhibitor to the surface of nitrification inhibitors comprised of one or more selected from the group consisting of 2-chloro-6-trichloromethyl)pyridine, 4-amino-1,2,4-6-triazole-HCl, 2,4-diamino-6-trichloromethyltriazine CL-1580, dicyandiamide (DCD), thiourea, ammonium thiosulfate, 1-mercapto-1,2,4-triazole, dimethylpyrazole organic and inorganic salts and 2-amino-4-chloro-6-methylpyrimidine. The combined impact of using a nitrification inhibitor coated with a urease inhibitor that is dissolved in a Non-aqueous Organic Solvent Delivery System (NOSDS) with enhanced storage stability lowers the cost of fertilizer by delivering optimized and homogeneous levels of both inhibitors improving the longevity of nitrogen in the soil.

In an embodiment, the present invention relates to an additive that imparts to liquid or solid manmade fertilizer, manure, waste or compost an increased longevity of plant available nitrogen in the soil wherein the additive is a dry, flowable composition created by coating dicyandiamide with a N-alkyl thiophosphoric triamide dissolved in a non-aqueous organo liquid system at concentrations of the N-alkyl thiophosphoric triamide in the solvent of 50-90%. The resulting coated DCD can then be mixed with natural or synthetic granular fertilizer or added to fertilizer combination of urea and ammonium nitrate that has been dissolved in water (commercial name of UAN), which will inhibit biological oxidation of ammonia by soil microbes, such as *Nitrosomonas* bacteria and inhibit the enzymatic action of urease slowing the conversion urea nitrogen to ammoniacal nitrogen.

In one embodiment, the present invention relates to liquid formulations comprised of urease inhibitors and a Non-aqueous Organic Solvent Delivery System (NOSDS) and is designed to coat nitrification inhibitor granules with an effective level of urease inhibitor(s) utilizing simple application equipment such as mixers, blenders and tumblers In an embodiment, an additive that imparts to liquid or solid manmade fertilizer, manure, waste or compost an increased longevity of plant available nitrogen in the soil wherein the additive is a dry, flowable composition comprising one or more solid nitrification inhibitor(s) coated with a liquid formulation comprised of one or more urease inhibitor(s) that have been solubilized within a non-aqueous organo solvent delivery system (NOSDS) wherein the NOSDS is further comprised of one or more aprotic and protic solvent(s) wherein said aprotic solvent(s) is one or more members selected from the group consisting of:

a. dimethyl sulfoxide
b. and one or more sulfoxide(s) selected from the group consisting of dialkyl, diaryl, or alkylaryl sulfoxide(s) selected from the formula structure:

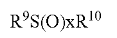

wherein
i. $R^9$ and $R^{10}$ are each independently a $C_1$-$C_6$ alkylene group, an aryl group or $C_1$-$C_3$ alkylenearyl group
ii. or $R^9$ and $R^{10}$ with the sulfur to which they are attached form a 4 to 8 membered ring wherein $R^9$ and $R^{10}$ together are a $C_1$-$C_6$ alkylene group which optionally contains one or more atoms selected from the group consisting of O, S, Se, Te, N, and P in the ring
iii. and x is 1 or 2 c. one or more alkylene carbonates selected from the group consisting of ethylene carbonate, propylene carbonate and butylene carbonate
d. one or more polyols capped with acetate or formate wherein the polyol portion selected from the group consisting of ethylene glycol, 1,3 propylene glycol, 1,2 propylene glycol, butylene glycol, trimethylol propane, trimethylol ethane, pentaerythritol, sorbitol and sorbitan, glucose, fructose, galactose and glycerin
e. one or more alkylene glycol alkyl ethers acetates selected from the group consisting of dipropylene glycol methyl ether acetate, tripropylene glycol methyl ether acetate, and tripropylene glycol butyl ether acetate
f. one or more diesters selected from the group consisting of dimethylsuccinate, dimethyl adipate, diethyl glutarate, and dimethyl glutarate,
g. one or more alkyl pryrrolidone selected from the group consisting of 1-Methyl-2-pyrrolidone and cyclohexylpyrrolidone,
h. one or more selected from the group consisting of dimethylacetamide, dimethylformamide, dimethyl-2-imidazolidinone, isophorone, hexamethylphosphoramide, 1,2-dimethyloxyethane, 2-methoxyethyl ether and limonene
i. One or more trialkyl phosphates selected from the group consisting of triethyl phosphate and tributyl phosphate and wherein said protic solvent is one or more members selected from the group consisting of:

a. one or more alcohols selected from the group consisting of the family of $C_1$-$C_{10}$ alkanols
b. one or more polyols selected from the group consisting of trimethylol propane, trimethylol ethane, pentaerythritol, sorbitol and sorbitan, glucose, fructose, galactose, and glycerin
c. one or more polyalkylene glycols selected from the group consisting of poly($C_1$-$C_{10}$ alkylene) glycols,
d. isopropylidene glycerol
e. one or more alkylene glycol alkyl ethers selected from the formula structure:

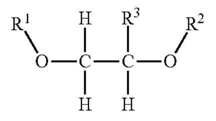

wherein
i. $R^1$ is one or more members selected from the group consisting of $CH_3$, $C_2H_5$, $C_3H_7$ and $C_4H_9$
ii. $R^2$ is one or more members selected from the group consisting of H and

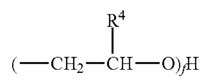

wherein
(1) $R^4$ is one or more members selected from the group consisting of H and $CH_3$,
(2) and f is an integer between 1 and 15,
iii. wherein $R^3$ is one or more members selected from the group consisting of H and $CH_3$ f. one or more alkyl lactates selected from the group consisting of ethyl, propyl and butyl lactate
g. one or more alkanolamines selected from the group consisting of alkanolamines selected from the formula structure:

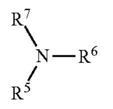

wherein
i. $R^5$ is one or more members selected from the group consisting of $C_2H_4OR^8$ and $C_3H_6OH$
ii. $R^6$ is: H, $C_2H_4OR^8$ and $C_3H_6OH$
iii. $R^7$ is one or more members selected from the group consisting of H, $C_2H_4OR^8$ and $C_3H_6OH$
wherein
(1) $R^8$ is $(C_2H_4O)_gH$
wherein
(a) g is an integer between 1-10 h. and glycerol carbonate such that said dry, flowable additive's composition weight percent comprises 80-99% nitrification inhibitor, 18-0.5% urease inhibitor and 10-0.2% NOSDS wherein said NOSDS's composition consist of a weight percent range for protic to aprotic solvents of 0%:100% to 100%:0%.

Thus in one embodiment, the present invention relates to improved compositions of a solution of urease inhibitor(s) in a non-aqueous organo solvent delivery system for coating the surface of nitrification inhibitor(s) that:

Are environmentally safe;
Have flashpoints above 145° F.;
Are inherently rated safe for contact with humans and animals;
Forms a liquid solution at 20-70° C. of urease inhibitors comprising a composition consisting of a % weight ratio of NOSDS at 50-10% to urease inhibitors at 50-90 for coating the surfaces of nitrification inhibitors with urease inhibitors Provides an even and effective coating of urease inhibitor to the surfaces of nitrification inhibitors granules and powders while not causing clumping of the granules or powder.

Assisting the coated nitrification inhibitor granules and powders to easily dissolve in water or aqueous fertilizers resulting in a clear and stable solution ready for application to plants and to soil.

In one embodiment, the present invention relates to compositions having at least 0.5-20% of active urease inhibitor on the surface of nitrification inhibitors.

In one embodiment, it has also been discovered that while various organo-liquids might meet some of the above criteria, the delivery system of the present invention can be optimized to provide a formulation with a high concentration of inhibitors while maintaining a chill point of 20° C. to 60° C. by combining two or more organo-liquids in a solvating system.

In an embodiment, a method of preparing the additive comprises: a. Suspending or making a solution of urease inhibitor(s) in a NOSDS at temperatures 20-70° C. wherein the urease inhibitor is in the % weight range of about 50 to 90%; b. In a separated vessel, placing powder or granular nitrification inhibitor(s) under agitation at 20-70° C.; c. Slowly adding the slurry or solution of the urease inhibitor(s) from "a" to powder or granules of nitrification inhibitor(s) and mixing until the urease inhibitor(s) in NOSDS has uniformly coated the nitrification inhibitor(s) wherein the composition's weight percent comprises 80-99% nitrification inhibitor(s), 18-0.5% urease inhibitor(s) and 10-0.2% NOSDS. In a variation the additive's composition comprises adding a flow modifier to improve handling properties and wherein the additive is a dry, flowable solid.

In an embodiment, the improved delivery formulations have been developed that can impart effective levels of urease inhibitors to the surface of nitrification inhibitors that increase the nitrogen longevity in the soil. These formulations not only provide a liquid vehicle to deliver an even, non-clumping application of the desired inhibitors to the nitrification granules, but it has been discovered that formulations based on non-aqueous solvating systems improve the storage life of the important urease inhibitors, such as alkyl thiophosphoric triamides. Alkyl thiophosphoric triamides have been shown to be extremely effective urease inhibitors but suffer from degradation upon storage if exposed to moisture. Thus, in one embodiment the present invention relates to compositions that are substantially free of water.

In an embodiment, the composition of the liquid urease inhibitor concentrate further comprises of one or more of the group consisting of:

Nitrification inhibitor(s);

NOSDS

Additives such as but not limited to surfactants, buffers, fragrance/odor masking agents, colorants, micro-nutrients, and/or flow modifiers such as silica.

In one embodiment, during the process of coating of the nitrification inhibitors with the liquid urease inhibitor concentrate, one may optionally include one or more of the group consisting of surfactants, buffers, fragrance/odor masking agents, colorants, micro-nutrients, and/or flow modifiers.

In one embodiment, the solvating system of the present invention is a NOSDS, which comprises one or more of the group consisting of: dimethyl sulfoxide, sulfolane, tetramethylene sulfoxide dimethylacetamide, dimethylformamide hexamethylphosphoramide, triethylphosphate, tributyl phosphate, propylene carbonate, ethylene carbonate, butylene carbonate, N-alkyl-2-pyrrolidone, 1,2-dimethyloxyethane, 2-methoxyethyl ether, cyclohexylpyrrolidone, ethyl lactate, and 1,3 dimethyl-2-imidazolidinone, limonene, ethylene glycol, propylene glycol, butylene glycol, trimethylol propane, pentaerythritol, glycerin, trimethylol ethane, polyethylene glycol, polypropylene glycol, polyethylene/polypropylene glycol co-polymer, Tripropylene glycol methyl ether, Tripropylene glycol butyl ether, acetate and/or fumarate capping of glycols which include but are not limited to the following glycols:

ethylene glycol, propylene glycol, butylene glycol, trimethylol propane, pentaerythritol, glycerin, trimethylol ethane, polyethylene glycol, polypropylene glycol, polyethylene/polypropylene glycol co-polymer, Tripropylene glycol methyl ether, Tripropylene glycol butyl ether.

Additionally, the NOSDS of the present invention may be comprised of one or more of the group consisting of:

a food coloring or dye that may be used to improve the visual evidence of complete coverage and serve as a visual marker;

scents or masking agents to improve the odor of the formulations;

Nonionic, anionic, cationic, zwitterionic, and/or amphoteric surfactants to improve formula application performance of nitrification inhibitor granules; and Buffering agents.

In an embodiment, the liquid urease inhibitor concentrate may be utilized to coat nitrification inhibitors comprised of one or more of the group consisting of 2-chloro-6-trichloromethyl)pyridine, 4-amino-1,2,4-6-triazole-HCl, 2,4-diamino-6-trichloromethyltriazine CL-1580, dicyandiamide (DCD), thiourea, ammonium thiosulfate, 1-mercapto-1,2,4-triazole, dimethylpyrazole organic and inorganic salts and 2-amino-4-chloro-6-methylpyrimidine. In one embodiment, the formulations of the present invention may use dicyandiamide as the nitrification inhibitor that is coated with a formulation comprised of dimethyl sulfoxide and n-butyl thiophosphoric triamide (NBPT). Both actives also provide the secondary benefit of being slow release fertilizers. In one embodiment, the fertilizer additive provides for compositions that are substantially free of water. The present invention is also advantageous relative to other systems that have used cost prohibitive coating/adhesion technologies.

In one embodiment of the present invention, the utilization of low temperature application allows for non-clumping of the coated nitrification inhibitor granules. Moreover, the use of low temperature application of a coating comprised of NOSDS and a urease inhibitor limits the thermal degradation of the components. In one embodiment, the present invention allows for the additional benefit of coating utilizing simple equipment such as blenders, tumbler and mixers and does not require molten urea, high temperature, addition of adhesives or coating of a urea formaldehyde polymer with a urease inhibitor. The innovative additive results in urease coated nitrification inhibitor granules that are easily soluble in water and aqueous fertilizers resulting in more even distribution of the urease and nitrification inhibitor when applied to soil or plants.

In an embodiment, the formulation(s) of the present invention may contain one or more nitrification inhibitors coated with one or more urease inhibitors dispersed within the NOSDS.

In an embodiment, the innovative additive's composition comprises one or more urease inhibitors selected from the group consisting of a. One or more alkyl phosphoric amide selected from the formula structure:

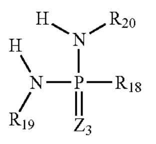

wherein:

i. $R_{18}$ is one or more members selected from the group consisting of $CH_3$, $C_2H_5$, $C_3H_7$, $C_4H_9$, $C_5H_{11}$, $C_6H_{13}$, $C_6H_5$, $C_7H_7$, $OX_4$, $OCH_3$, $OC_2H_5$, $OC_3H_7$, $OC_4H_9$, OC5H11, $OC_6H_{13}$, and $HNR_{21}$ wherein (1) $R_{21}$ is one or more members selected from the group consisting of H, $CH_3$, $C_2H_5$, $C_3H_7$, $C_4H_9$, $C_5H_{11}$ and $C_6H_{13}$ (2) $X_4$ is one or more members selected from the group consisting of (a) H, Na, Li and K, (b) $NH_4$ (c) one or more organoamines selected from the group consisting of mono $C_{1-6}$ amine, di $C_{1-6}$ amine, tri $C_{1-6}$ amine, mono ethanol amine, diethanol amine, triethanol amine, monoisopropanol amine, diisopropanol amine, triisopropanol amine, ethylene diamine diethylene triamine, triethylene tetraamine, and tetraethylene pentamine.

ii. $R_{19}$ is one or more members selected from the group consisting of H, $CH_3$, $C_2H_5$, $C_3H_7$, $C_4H_9$, $C_5H_{11}$ and $C_6H_{13}$, iii. $R_{20}$ is one or more members selected from the group consisting of H, $CH_3$, $C_2H_5$, $C_3H_7$, $C_4H_9$, $C_5H_{11}$ and $C_6H_{13}$ iv. $Z_3$ is one or more members selected from the group consisting of Oxygen and Sulfur.

b. One or more (aminomethylene)phosphinic acids and their salts selected by the formula structure:

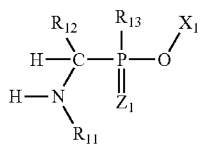

wherein:

i. $R_{11}$ is one or more members selected from the group consisting of H, $CH_3$, $C_2H_5$, $C_3H_7$, $C_4H_9$, $C_5H_{11}$, $C_6H_{13}$, $C_7H_{15}$ and $C_8H_{17}$, ii. $R_{12}$ is one or more members selected from the group consisting of H, $CH_3$, $C_2H_5$, $C_3H_7$, $C_4H_9$, $C_5H_{11}$ and $C_6H_{13}$, iii. $R_{13}$ is one or more members selected from the group consisting of H, O—$X_3$, $CH_3$, $C_2H_5$, $C_3H_7$, $C_4H_9$, $C_5H_{11}$, $C_6H_{13}$, $C_7H_{15}$, $C_8H_{17}$, $OCH_3$, $OC_2H_5$, $OC_3H_7$, $OC_4H_9$, OC5H11, $OC_6H_{13}$, $OC_7H_{15}$ and $OC_8H_{17}$ wherein (1) $X_3$ is one or more members selected from the group consisting of selected from the group consisting of:

(a) H, Na, Li, Mg, Ca, Fe, Zn, Mn, Cu, Co, Mo, Ni and K, (b) $NH_4$ (c) one or more organoamines selected from the group consisting of mono $C_{1-6}$ amine, di $C_{1-6}$ amine, tri $C_{1-6}$ amine, mono ethanol amine, diethanol amine, triethanol amine, monoisopropanol amine, diisopropanol amine, triisopropanol amine, ethylene diamine diethylene triamine, triethylene tetraamine, and tetraethylene pentamine.

iv. $X_1$ is one or more members selected from the group consisting of (a) H, Na, Mg, Ca, Fe, Zn, Mn, Cu, Co, Mo, Ni, Li and K, (b) $NH_4$ (c) one or more organoamines selected from the group consisting of mono $C_{1-6}$ amine, di $C_{1-6}$ amine, tri $C_{1-6}$ amine, mono ethanol amine, diethanol amine, triethanol amine, monoisopropanol amine, diisopropanol amine, triisopropanol amine, ethylene diamine diethylene triamine, triethylene tetraamine, and tetraethylene pentamine.

v. $Z_1$ is one or more members selected from the group consisting of Oxygen and Sulfur.

c. and one or more bis-(aminomethylene)phosphinic acids and their salts selected from the formula structure:

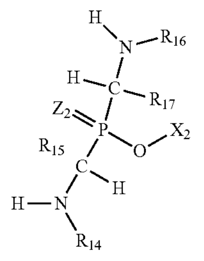

wherein:

i. $R_{14}$ is one or more members selected from the group consisting of H, $CH_3$, $C_2H_5$, $C_3H_7$, $C_4H_9$, $C_5H_{11}$, $C_6H_{13}$, $C_7H_{15}$ and $C_8H_{17}$ ii. $R_{15}$ is one or more members selected from the group consisting of H, $CH_3$, $C_2H_5$, $C_3H_7$, $C_4H_9$, $C_5H_{11}$ and $C_6H_{13}$ iii. $R_{16}$ is one or more members selected from the group consisting of H, $CH_3$, $C_2H_5$, $C_3H_7$, $C_4H_9$, $C_5H_{11}$, $C_6H_{13}$, $C_7H_{15}$ and $C_8H_{17}$ iv. $R_{17}$ is one or more members selected from the group consisting of H, $CH_3$, $C_2H_5$, $C_3H_7$, $C_4H_9$, $C_5H_{11}$ and $C_6H_{13}$ v. $X_2$ is one or more members selected from the group consisting of (a) H, Na, Li, Mg, Ca, Fe, Zn, Mn, Cu, Co, Mo, Ni and K, (b) $NH_4$ (c) one or more organoamines selected from the group consisting of mono $C_{1-6}$ amine, di $C_{1-6}$ amine, tri $C_{1-6}$ amine, mono ethanol amine, diethanol amine, triethanol amine, monoisopropanol amine, diisopropanol amine, triisopropanol amine, ethylene diamine diethylene triamine, triethylene tetraamine, and tetraethylene pentamine.

vi. $Z_2$ is one or more members selected from the group consisting of Oxygen and Sulfur.

In a variation, the additive's composition comprises the urease inhibitor N-(n-butyl) thiophosphoric triamide.

In one embodiment, the present invention relates to using a low temperature dispersion procedure (20° C.-70° C.) with one or more phosphoric triamides in a formulation. In one variation, this low temperature procedure and the application of the formulation to the surface of pre-formed nitrification inhibitor granules prevents thermal degradation of these phosphoric triamides.

In an embodiment, nitrification inhibitor granules can be charge to a ribbon blender and warmed to 30-70° C. A solution comprised of a urease inhibitor, a colorant and a NOSDS can be sprayed on the surface of the nitrification inhibitor while under agitation and mixed until a homogeneous coating can be observed. A flow aid comprised of one or more from the group consisting of silicas, nonionic surfactants, soaps, inorganic powders, or nonionic surfactants may be added to improve the flow and/or the dispersability of the powder. In a variation, the temperature of the NOSDS and urease inhibitor based product can be heated to 70° C. max In an embodiment, the innovative additive can be applied to soil in either a liquid or granular form to provide improved nitrogen retention in the soil for uptake for plant life.

In an embodiment, the innovative additive's composition further comprises an aqueous solution of the 0.1-10 weight % of said additive added to manure, waste or compost. In a variation, the addition of the aqueous solution of the additive can be applied to manure, waste or compost by automated spray or metering system or by manual sprayer to improve the longevity of the nitrogen content of these organic fertilizers.

In an embodiment, the present invention is based on urease inhibitor coating on the surface of nitrification inhibitors comprising of one or more of the group consisting of 2-chloro-6-trichloromethyl)pyridine, 4-amino-1,2,4-6-triazole-HCl, 2,4-diamino-6-trichloromethyltriazine CL-1580, dicyandiamide (DCD), thiourea, 1-mercapto-1,2,4-triazole, ammonium thiosulfate, dimethylpyrazole organic and inorganic salts and 2-amino-4-chloro-6-methylpyrimidine. In an embodiment, the urease inhibitor coating on nitrification inhibitors is achieved through the liquid urease inhibitor concentrate composition comprised of urease inhibitors from the group consisting of one or more of a) phosphoric triamides, thiophosphoric triamides and alkylated thiophosphoric triamides, wherein the alkylated thiophosphoric triamides has one or more alkyl groups that independently contain between 1 and 6 carbon atoms, b) (aminomethylene) phosphinic acids and their salts and c) bis-(aminomethylene) phosphinic acids and their salts.

In an embodiment, the composition may comprise one or more of surfactants, buffers, fragrance/odor masking agents, colorants, micro-nutrients, and/or flow modifiers.

In an embodiment, the composition is substantially free of water.

In one embodiment, the additive relates to liquid formulations comprised of NBPT and a Non-aqueous Organic Solvent Delivery System (NOSDS) and is designed to coat nitrification inhibitor granules with an effective level of NBPT utilizing simple application equipment such as mixers, blenders and tumblers.

In an embodiment the NOSDS is comprised of aprotic and protic solvents wherein said protic solvent(s) is selected from of one or more of the group consisting of: 1) an alcohol from the family of C1-10 alkanols, 2) one or more polyols from the group consisting of trimethylol propane, trimethylol ethane, pentaerythritol, sorbitol and sorbitan, glucose, fructose, galactose, and glycerin, 3) poly(C1-10 alkylene) glycols, 4) one or more alkylene glycols from the group consisting of ethylene glycol, 1,3 propylene glycol, 1,2 propylene glycol, and butylene glycol, 5) isopropylidene glycerol 6) one or more alkylene glycol alkyl ethers represented by the structure:

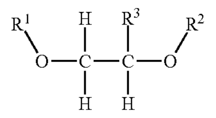

Wherein $R^1$ is: $CH_3$, $C_2H_5$, $C_3H_7$ or $C_4H_9$ $R^2$ is: H or

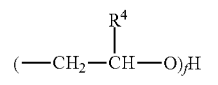

$R^3$ is: H or $CH_3$ $R^4$ is H and/or $CH_3$

And f is an integer between 1 and 15, 7) one or more alkyl lactates from the group consisting of ethyl, propyl and butyl lactate, 8) one or more alkanolamines represented by the structure:

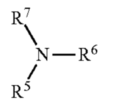

Wherein $R^5$ is: $C_2H_4OR^8$ or $C_3H_6OH$ $R^6$ is: H, $C_2H_4OR^8$ or $C_3H_6OH$ $R^7$ is: H, $C_2H_4OR^8$ or $C_3H_6OH$ $R^8$ is: $(C_2H_4O)_gH$ And g is an integer between 1 and 10 and 9) glycerol carbonate.

b) and/said aprotic solvent(s) is selected from the group consisting of 1) dimethyl sulfoxide and/or 2) dialkyl, diaryl, or alkylaryl sulfoxide(s) having the formula:

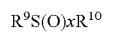

$R^9S(O)xR^{10}$ wherein $R^9$ and $R^{10}$ are each independently a $C_{1-6}$ alkylene group, an aryl group, or $C_{1-3}$alkylenearyl group or $R^9$ and $R^{10}$ with the sulfur to which they are attached form a 4 to 8 membered ring wherein $R^9$ and $R^{10}$ together are a $C_{1-6}$ alkylene group which optionally contains one or more atoms selected from the group consisting of O, S, Se, Te, N, and P in the ring and x is 1 or 2, 3) one or more alkylene carbonates selected from the group consisting of ethylene carbonate, propylene carbonate and butylene carbonate, 4) one or more polyols capped with acetate or formate wherein the polyol portion selected from the group consisting of ethylene glycol, 1,3 propylene glycol, 1,2 propylene glycol, butylene glycol, trimethylol propane, trimethylol ethane, pentaerythritol, sorbitol and sorbitan, glucose, fructose, galactose and glycerin, 5) one or more alkylene glycol alkyl ethers acetates selected from the group consisting of dipropylene glycol methyl ether acetate, tripropylene glycol methyl ether acetate, and/or tripropylene glycol butyl ether acetate and, 6) isophorone, 7) one or more diesters consisting of dimethylsuccinate, dimethyl adipate, diethyl glutarate, and dimethyl glutarate, 8) dimethylacetamide, 9) dimethylformamide, 10) dimethyl-2-imidazolidinone, 11) 1-methyl-2-pyrrolidone, 12) hexamethylphosphoramide, 13) 1,2-dimethyloxyethane, 14) 2-methoxyethyl ether, 15)cyclohexylpyrrolidone and 16) limonene.

In a variation, the additive that imparts to liquid or solid manmade fertilizer, manure, waste or compost an increased longevity of plant available nitrogen wherein the additive is a dry, flowable composition comprising one or more solid nitrification inhibitor(s) coated with a liquid formulation comprised of one or more urease inhibitor(s) that have been solubilized within a non-aqueous organo solvent delivery system (NOSDS) wherein the NOSDS is comprised of one or more aprotic solvents selected from the group consisting of 1) dimethyl sulfoxide and/or 2) dialkyl, diaryl, or alkylaryl sulfoxide(s) having the formula:

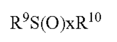

$$R^9S(O)xR^{10}$$

wherein $R^9$ and $R^{10}$ are each independently a $C_{1-6}$ alkylene group, an aryl group, or $C^{1-3}$ alkylenearyl group or $R^9$ and $R^{10}$ with the sulfur to which they are attached form a 4 to 8 membered ring wherein $R^9$ and $R^{10}$ together are a C alkylene group which optionally contains one or more atoms selected from the group consisting of O, S, Se, Te, N, and P in the ring and x is 1 or 2 wherein the composition's weight percent is 80-99% nitrification inhibitor, 18-0.5% urease inhibitor and 10-0.2% polar aprotic solvent(s).

In one embodiment, the liquid urease inhibitor concentrate of the present invention relates to liquid formulations comprised of NBPT and a Non-aqueous Organic Solvent Delivery System (NOSDS) and is designed to coat nitrification inhibitor granules with an effective level of NBPT utilizing simple application equipment such as mixers, blenders and tumblers. In an embodiment the NOSDS is comprised of one or more selected from the group consisting of:

dimethyl sulfoxide, sulfolane, tetramethylene sulfoxide dimethylacetamide, dimethylformamide hexamethylphosphoramide, triethylphosphate, tributylphophate, propylene carbonate, ethylene carbonate, butylene carbonate, N-alkyl-2-pyrrolidone, 1,2-dimethyloxyethane, 2-methoxyethyl ether, cyclohexylpyrrolidone, ethyl lactate, and 1,3 dimethyl-2-imidazolidinone, limonene, ethylene glycol, propylene glycol, butylene glycol, trimethylol propane, pentaerythritol, glycerin, trimethylol ethane, polyethylene glycol, polypropylene glycol, polyethylene/polypropylene glycol co-polymer, tripropylene glycol methyl ether, tripropylene glycol butyl ether, acetate and/or fumarate capping of glycols which include but are not limited to the following glycols: ethylene glycol, propylene glycol, butylene glycol, trimethylol propane, pentaerythritol, glycerin, trimethylol ethane, polyethylene glycol, polypropylene glycol, polyethylene/polypropylene glycol co-polymer, tripropylene glycol methyl ether, and tripropylene glycol butyl ether.

In an embodiment, the present invention relates to nitrification inhibitor additives. In one embodiment, the nitrification inhibitor additive comprises one or more one or more urease inhibitors dispersed in a NOSDS.

In an embodiment, the additive comprises one or more urease inhibitors that are selected from the group consisting of a) phosphoric triamides, b) thiophosphoric triamides, c) alkylated thiophosphoric triamides, wherein the alkylated thiophosphoric triamides has one or more alkyl groups that independently contain between 1 and 6 carbon atoms, d) (aminomethylene)phosphinic acids and their salts and e) bis-(aminomethylene)phosphinic acids and their salts.

In an embodiment, the present invention relates to making compositions and coating nitrification inhibitors. In one embodiment, the present invention relates to a method of making a composition to be coated on a nitrification inhibitor, wherein the method comprises:

1) heating a mixture comprising of a NOSDS and one or more urease inhibitors that are selected from the group consisting of a) phosphoric triamides, b) thiophosphoric triamides, c) alkylated thiophosphoric triamides, wherein the alkylated thiophosphoric triamides has one or more alkyl groups that independently contain between 1 and 6 carbon atoms, d) (aminomethylene) phosphinic acids and their salts and e) bis-(aminomethylene)phosphinic acids and their salts.
2) to effectuate mixing of the mixture;
3) holding the mixture to a temperature that is fluid and that optionally allows addition of one or more of surfactants, buffers, fragrance/odor masking agents, colorants, micro-nutrients, and/or flow modifiers.

In an embodiment, the method comprises further adding the composition to coat a nitrification inhibitor utilizing simple blending equipment. The coated nitrification inhibitor can then be added to a UAN aqueous solution at levels of 0.5-5% resulting in a clear, stable solution that can then be applied to the soil and as a foliar application.

In one variation, the additive's composition comprises one or more coated nitrification inhibitors selected from the group consisting of 2-chloro-6-trichloromethyl)pyridine, 4-amino-1,2,4-6-triazole-HCl, 2,4-diamino-6-trichloromethyltriazine CL-1580, dicyandiamide (DCD), thiourea, 1-mercapto-1,2,4-triazole, ammonium thiosulfate, dimethylpyrazole organic and inorganic salts and 2-amino-4-chloro-6-methylpyrimidine. In one embodiment, the additive has a composition that is substantially free of water.

In another embodiment, the nitrification inhibitor coated with a urease inhibitor that has been dissolved in a NOSDS is added to an aqueous fertilizer such as a UAN at levels of 0.025-5%.

In an embodiment, a composition consisting of nitrification inhibitor(s) coated with an urease inhibitor that has been solubilized with a NOSDS such that the composition's weight percent is 80-99% nitrification inhibitor, 18-0.5% urease inhibitor and 10-0.1% NOSDS. In one variation the NOSDS is dimethyl sulfoxide. In another variation the nitrification inhibitors comprise one or more from the group consisting of 2-chloro-6-trichloromethyl)pyridine, 4-amino-1,2,4-6-triazole-HCl, 2,4-diamino-6-trichloromethyltriazine CL-1580, dicyandiamide (DCD), thiourea, 1-mercapto-1,2,4-triazole, ammonium thiosulfate, dimethylpyrazole organic and inorganic salts and 2-amino-4-chloro-6-methylpyrimidine. In another variation, the urease inhibitor comprises an alkylthiophosphoric triamide.

In an embodiment, the dry, flowable additive can be added to molten urea at a rate of additive to urea 4 to 20 lbs additive/ton of urea. In a variation, the additive/urea combination can be further processed into granules or prills containing urea with the required amount of nitrification and urease inhibitors to effective extend the longevity of plant available nitrogen in the soil.

Fertilizer coating technology utilizes liquid solutions of inhibitors to impart to the coated urea longevity of plant available nitrogen in the soil. However, this technology has limitations as the application level approaches 0.75% of the liquid coating on urea. Higher % coating levels causes the urea to become wet negatively impacting the coated urea processability in mixing and application equipment with the formation of clogs and high level of deposition of the fertilizer requiring more frequent cleaning and the formation of clumps of fertilizer impacting evenness of fertilizer application to the soil. In an embodiment, % NBPT can be dissolved in % DMSO and then coated on % DCD particle size 0.05-100 microns. In a variation, this innovative additive can be mixed with urea at levels of 5-20 lbs of additive/ton of urea to meet the minimum effective levels of DCD and NBPT required to extend the longevity of plant available nitrogen in the soil. In another variation, the small particle size of the additive allows better adhesion to the urea granule or prill. In another variation, the additive is a dry, flowable powder and will not negatively impact the processibility of urea during the addition process or the application of the urea to the soil.

In an embodiment, the innovative additive can be dissolved in water at weight % of 0.1-5% of the mixture and then easily sprayed onto natural fertilizers such as manure to reduce loss of "N" due to microbial activity. Using a aqueous delivery system for natural fertilizers results in lower cost versus solvent based liquid inhibitors and can be safely applied by automated spraying systems.

In an embodiment, the innovative additive can be easily dissolved into liquid fertilizer systems such as UAN utilizing simple mixing equipment at application levels of 0.05-5.0%. In a variation, the innovative additive level in a liquid fertilizer can be 0.5-3%.

In an embodiment, the present invention provides for a composition that is easy to dissolve resulting in a clear, stable solution in order to insure homogeneity of the inhibitors throughout the aqueous fertilizer and which can deliver the required levels of urease and nitrification inhibitors in an economically and homogeneous manner to plants and to the soil while technologies utilizing a urea formaldehyde polymer that is coated with NBPT and then mix with DCD powder will have poor solubility in a UAN solution and results in an uneven application level of inhibitors.

In an embodiment, an additive that imparts to liquid or solid manmade fertilizer, manure, waste or compost an increased longevity of plant available nitrogen in the soil wherein the additive is a dry, flowable composition comprising one or more solid nitrification inhibitor(s) coated with a liquid formulation comprised of one or more urease inhibitor(s) that have been solubilized within a non-aqueous organo solvent delivery system (NOSDS) wherein the NOSDS is comprised of one or more aprotic organo solvents selected from the group consisting of:

a. dimethyl sulfoxide
b. and one or more sulfoxide(s) selected from the group consisting of dialkyl, diaryl, or alkylaryl sulfoxide(s) selected from the formula structure:

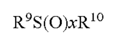

wherein
i. $R^9$ and $R^{10}$ are each independently a $C_1$-$C_6$ alkylene group, an aryl group or $C_1$-$C_3$ alkylenearyl group
ii. or $R^9$ and $R^{10}$ with the sulfur to which they are attached form a 4 to 8 membered ring wherein $R^9$ and $R^{10}$ together are a $C_1$-$C_6$ alkylene group which optionally contains one or more atoms selected from the group consisting of O, S, Se, Te, N, and P in the ring
iii. and x is 1 or 2 and wherein the NOSDS optional further comprised of one or more aprotic and protic solvents wherein the aprotic solvent(s) is one or more members selected from the group consisting of:

a. one or more alkylene carbonates selected from the group consisting of ethylene carbonate, propylene carbonate and butylene carbonate
b. one or more polyols capped with acetate or formate wherein the polyol portion selected from the group consisting of ethylene glycol, 1,3 propylene glycol, 1,2 propylene glycol, butylene glycol, trimethylol propane, trimethylol ethane, pentaerythritol, sorbitol and sorbitan, glucose, fructose, galactose and glycerin
c. one or more alkylene glycol alkyl ethers acetates selected from the group consisting of dipropylene glycol methyl ether acetate, tripropylene glycol methyl ether acetate, and tripropylene glycol butyl ether acetate
d. one or more diesters selected from the group consisting of dimethylsuccinate, dimethyl adipate, diethyl glutarate, and dimethyl glutarate,
e. one or more alkyl pyrrolidone selected from the group consisting of 1-Methyl-2-pyrrolidone and cyclohexylpyrrolidone,
f. one or more selected from the group consisting of dimethylacetamide, dimethylformamide, dimethyl-2-imidazolidinone, isophorone, hexamethylphosphoramide, 1,2-dimethyloxyethane, 2-methoxyethyl ether and limonene
g. One or more trialkyl phosphates selected from the group consisting of triethyl phosphate and tributyl phosphate and wherein said protic solvent is one or more members selected from the group consisting of:

a. one or more alcohols selected from the group consisting of the family of $C_1$-C10 alkanols
b. one or more polyols selected from the group consisting of trimethylol propane, trimethylol ethane, pentaerythritol, sorbitol and sorbitan, glucose, fructose, galactose, and glycerin
c. one or more polyalkylene glycols one or more members selected from the group consisting of poly ($C_1$-$C_{10}$ alkylene) glycols,
d. isopropylidene glycerol
e. one or more alkylene glycol alkyl ethers selected from the formula structure:

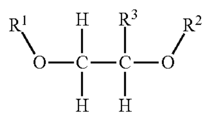

wherein i. $R^1$ is one or more members selected from the group consisting of $CH_3$, $C_2H_5$, $C_3H_7$ and $C_4H_9$ ii. $R^2$ is one or more members selected from the group consisting of H and

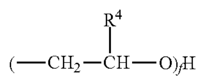

wherein (1) Where $R^4$ is one or more members selected from the group consisting of H and $CH_3$ (2) and f is an integer between 1 and 15, iii. wherein $R^3$ is one or more members selected from the group consisting of H and $CH_3$ f. one or more alkyl lactates selected from the group consisting of ethyl, propyl and butyl lactate g. one or more alkanolamines selected from the group consisting of alkanolamines selected from the formula structure:

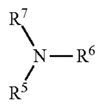

wherein i. $R^5$ is one or more members selected from the group consisting of $C_2H_4OR^8$ and $C_3H_6OH$ ii. $R^6$ is: H, $C_2H_4OR^8$ and $C_3H_6OH$ iii. $R^7$ is one or more members selected from the group consisting of H, $C_2H_4OR^8$ and $C_3H_6OH$ wherein (1) $R^8$ is $(C_2H_4O)_gH$ wherein (a) g is an integer between 1-10 h. and glycerol carbonate such that said dry, flowable additive's composition weight percent comprises 80-99% nitrification inhibitor, 18-0.5% urease inhibitor and 10-0.2% NOSDS wherein said NOSDS's composition consist of a weight percent range for protic to aprotic solvents of 0%:100% to 100%:0%.

In a variation, an additive that imparts to liquid or solid manmade fertilizer, manure, waste or compost an increased longevity of plant available nitrogen in the soil wherein the additive is a dry, flowable composition comprising one or more solid nitrification inhibitor(s) coated with a liquid formulation comprised of one or more urease inhibitor(s) that have been solubilized within a non-aqueous organo solvent delivery system (NOSDS) wherein the NOSDS is comprised of one or more aprotic solvent(s) wherein said aprotic solvent(s) comprise one or more selected from of the group consisting of:

a. dimethyl sulfoxide b. one or more sulfoxide(s) selected from of the groups consisting of dialkyl, diaryl, and alkylaryl sulfoxide(s) selected from the formula structure:

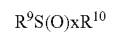

wherein i. $R^9$ and $R^{10}$ are each independently a $C_1$-$C_6$alkylene group, an aryl group, and $C_1$-$C_3$ alkylenearyl group ii. or $R^9$ and $R^{10}$ with the sulfur to which they are attached form a 4 to 8 membered ring wherein $R^9$ and $R^{10}$ together are a $C_1$-$C_6$alkylene group which optionally contains one or more atoms selected from the group consisting of O, S, Se, Te, N, and P in the ring iii. and x is 1 or 2 such that said dry, flowable additive's composition weight percent comprises 80-99% nitrification inhibitor, 18-0.5% urease inhibitor and 10-0.2% aprotic solvent(s).

In an embodiment, the innovative additive's composition comprises one or more nitrification inhibitor(s) selected from the group consisting of 2-chloro-6-trichloromethyl) pyridine, 4-amino-1,2,4-6-triazole-HCl, 2,4-diamino-6-trichloromethyltriazine CL-1580, dicyandiamide (DCD), thiourea, 1-mercapto-1,2,4-triazole, ammonium thiosulfate, dimethylpyrazole organic and inorganic salts and 2-amino-4-chloro-6-methylpyrimidine. In a variation, the additive's composition comprises one or more nitrification inhibitor(s) selected from the group consisting of 2-chloro-6-trichloromethyl)pyridine, dicyandiamide (DCD), thiourea, ammonium thiosulfate and dimethylpyrazole organic and inorganic salts. In another variation, the additive's composition comprises the nitrification inhibitor dicyandiamide.

In an embodiment, the innovative additive's composition comprises one or more urease inhibitors selected from the group consisting of a. One or more alkyl phosphoric amide selected from the formula structure:

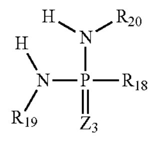

wherein:

i. $R_{18}$ is one or more members selected from the group consisting of $CH_3$, $C_2H_5$, $C_3H_7$, $C_4H_9$, $C_5H_{11}$, $C_6H_{13}$, $C_6H_5$, $C_7H_7$, $OX_4$, $OCH_3$, $OC_2H_5$, $OC_3H_7$, $OC_4H_9$, $OC_5H_{11}$, $OC_6H_{13}$, and $HNR_{21}$ wherein (1) $R_{21}$ is one or more members selected from the group consisting of H, $CH_3$, $C_2H_5$, $C_3H_7$, $C_4H_9$, $C_5H_{11}$ and $C_6H_{13}$ (2) $X_4$ is one or more members selected from the group consisting of (a) H, Na, Li and K, (b) $NH_4$ (c) one or more organoamines selected from the group consisting of mono $C_{1-6}$ amine, di $C_{1-6}$ amine, tri $C_{1-6}$ amine, mono ethanol amine, diethanol amine, triethanol amine, monoisopropanol amine, diisopropanol amine, triisopropanol amine, ethylene diamine diethylene triamine, triethylene tetraamine, and tetraethylene pentamine.

ii. $R_{19}$ is one or more members selected from the group consisting of H, $CH_3$, $C_2H_5$, $C_3H_7$, $C_4H_9$, $C_5H_{11}$ and $C_6H_{13}$, iii. $R_{20}$ is one or more members selected from the group consisting of H, $CH_3$, $C_2H_5$, $C_3H_7$, $C_4H_9$, $C_5H_{11}$ and $C_6H_{13}$ iv. $Z_3$ is one or more members selected from the group consisting of Oxygen and Sulfur.

b. One or more (aminomethylene)phosphinic acids and their salts selected by the formula structure:

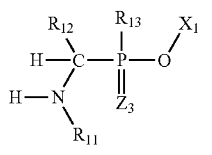

wherein:

i. $R_{11}$ is one or more members selected from the group consisting of H, $CH_3$, $C_2H_5$, $C_3H_7$, $C_4H_9$, $C_5H_{11}$, $C_6H_{13}$, $C_7H_{15}$ and $C_8H_{17}$, ii. $R_{12}$ is one or more members selected from the group consisting of H, $CH_3$, $C_2H_5$, $C_3H_7$, $C_4H_9$, $C_5H_{11}$ and $C_6H_{13}$, iii. $R_{13}$ is one or more members selected from the group consisting of H, O—$X_3$, $CH_3$, $C_2H_5$, $C_3H_7$, $C_4H_9$, $C_5H_{11}$, $C_6H_{13}$, $C_7H_{15}$, $C_8H_{17}$, $OCH_3$, $OC_2H_5$, $OC_3H_7$, $OC_4H_9$, OC5H11, $OC_6H_{13}$, $OC_7H_{15}$ and $OC_8H_{17}$ wherein (1) $X_3$ is one or more members selected from the group consisting of selected from the group consisting of:

(a) H, Na, Li, Mg, Ca, Fe, Zn, Mn, Cu, Co, Mo, Ni and K, (b) $NH_4$ (c) one or more organoamines selected from the group consisting of mono $C_{1-6}$ amine, di $C_{1-6}$ amine, tri $C_{1-6}$ amine, mono ethanol amine, diethanol amine, triethanol amine, monoisopropanol amine, diisopropanol amine, triisopropanol amine, ethylene diamine diethylene triamine, triethylene tetraamine, and tetraethylene pentamine.

(2) $X_1$ is one or more members selected from the group consisting of (a) H, Na, Li, Mg, Ca, Fe, Zn, Mn, Cu, Co, Mo, Ni and K, (b) $NH_4$ (c) one or more organoamines selected from the group consisting of mono $C_{1-6}$ amine, di $C_{1-6}$ amine, tri $C_{1-6}$ amine, mono ethanol amine, diethanol amine, triethanol amine, monoisopropanol amine, diisopropanol amine, triisopropanol amine, ethylene diamine diethylene triamine, triethylene tetraamine, and tetraethylene pentamine.

iv. $Z_1$ is one or more members selected from the group consisting of Oxygen and Sulfur.

c. and one or more bis-(aminomethylene)phosphinic acids and their salts selected from the formula structure:

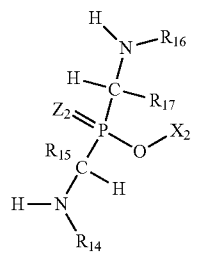

wherein:

i. $R_{14}$ is one or more members selected from the group consisting of H, $CH_3$, $C_2H_5$, $C_3H_7$, $C_4H_9$, $C_5H_{11}$, $C_6H_{13}$, $C_7H_{15}$ and $C_8H_{17}$ ii. $R_{15}$ is one or more members selected from the group consisting of H, $CH_3$, $C_2H_5$, $C_3H_7$, $C_4H_9$, $C_5H_{11}$ and $C_6H_{13}$ iii. $R_{16}$ is one or more members selected from the group consisting of H, $CH_3$, $C_2H_5$, $C_3H_7$, $C_4H_9$, $C_5H_{11}$, $C_6H_{13}$, $C_7H_{15}$ and $C_8H_{17}$ iv. $R_{17}$ is one or more members selected from the group consisting of H, $CH_3$, $C_2H_5$, $C_3H_7$, $C_4H_9$, $C_5H_{11}$ and $C_6H_{13}$ (1) $X_2$ is one or more members selected from the group consisting of (a) H, Na, Li, Mg, Ca, Fe, Zn, Mn, Cu, Co, Mo, Ni and K, (b) $NH_4$ (c) one or more organoamines selected from the group consisting of mono $C_{1-6}$ amine, di $C_{1-6}$ amine, tri $C_{1-6}$ amine, mono ethanol amine, diethanol amine, triethanol amine, monoisopropanol amine, diisopropanol amine, triisopropanol amine, ethylene diamine diethylene triamine, triethylene tetraamine, and tetraethylene pentamine.

v. $Z_2$ is one or more members selected from the group consisting of Oxygen and Sulfur.

In a variation, the additive's composition comprises one or more urease inhibitors selected from the group consisting of N-(n-butyl) thiophosphoric triamide and (hexylaminomethylene, aminomethylene) phosphinic acid ($C_8H_{20}N_2O_2P$) and/or its salts wherein said salt is derived from the reaction of a neutralizing agents with the phosphinic acid and wherein said neutralizing agents are comprised of a) one or more metal cations wherein metal cations are derived from one or more members selected from the group consisting of i) elemental metals ii) metal oxides iii) metal hydroxides, iv) metal alkylates and v) metal carbonates wherein the one or more metal cations' portion of the neutralizing agent is selected from the group consisting of Na, K, Mg, Ca, Fe, Zn, Mn, Cu, Co, Mo and Ni.

In a variation, the additive's composition comprises the urease inhibitor N-(n-butyl) thiophosphoric triamide.

In an embodiment, the additive's composition is comprised of urease inhibitors that are in a solution within the NOSDS at a weight ratio of 50-90% urease inhibitors to 50-10% NOSDS.

In an embodiment, the additive's composition further comprises one or more biologics selected from the group consisting of:

i. *Bacillus* biologics, ii) *Azospirillum* biologics, iii) Azobacter biologics iv) *Gluconacetobacter* biologics, v) Phosphobacteria, vi) Cyanobacteria, vii) *Herbaspirillum*, viii) *Burkholderia*, ix) *Pseudomonas*, x) *Gluconacetobacter*, xi) *Enterobacter*, xii) *Klebsiella*, xiii) *Burkholderia*, xiv) *Bradyrhiwbium* species, xv) *Bradyrhiwbium japonicum*, xvi) *Rhizobium meliloti*, xvii) *Laccaria bicolor*, xviii) *Glomus* imraradices timanita, xix) *Actinomyces*, xx) *Penicillium*, xxi) Mesorhizobiwn cicero, xxii) one or more insecticidal or insect repellent microbial species and strains selected from the group consisting of:

*Telenomus podisi, Baculovirus anticarsia; Trichogramma pretiosum, Trichogramma gallai, Chromobacterium subtsugae, Trichoderma fertile, Beauveria bassiana, Beauveria bassiana, Beauveria bassiana, Paecilomyces* jknwsoroseu!.•, *Trichoderma harzianum, Verticillium lecanii,* lsarfofumosarosea *Lecanicillium muscarium, Streptomyces microflavus, Muscodor albus,* xxiii) one or more nematodal microbial species and strains selected from the group consisting of:

*Myrothecium verrucaria, Pasteuria* species, *Pasteuria Metarhizium* species, *Flavobacteriwn* species xxiv) *Reynoutria sachalinensis* xxv) one or more antifungal, antimicrobial and/or plant growth promoting microbial species and strains selected from a group consisting of:

*Gliocladium* species, *Pseudomonas* species (e.g. *Pseudomonas fluorescens, Pseudomonas fluorescens. putida* and *P. chlororaphis*), *Pseudomonas fluorescens* VP5, *Pseudomonas diazotrophicus, Enterobacter cloacae, Trichodema species, Trichoderma virens, Trichoderma* atroviride strains, *Coniothyrium minitans, Gliocladium* species, *Gliacladium virens, Gliacladium roseum, Trichodemw harzianum* species, xxvi) Spore forming species of bacteria;

xxvii) Spore forming species of fungi;

xxviii) Mycorrhizal organisms including: *Laccaria bicolor, Glomus intraradices*, and *Amanita* species;

xxix) *Actinomyces* species and strains thereof, including: *Streptomyces lydicus, Streptomyces griseoviridis, Streptomyces griseoviridis, Streptomyces microflavus* xxx) *Bacillus* species and strains thereof, including: *Bacillus itchenifomis, Bacillus megaterium, Bacillus pumilus, Bacillus amyloliquefaciens, Bacillus licheniformis, Bacillus oleronius, Bacillus megaterium, Bacillus mojavensis, Bacillus pumilus, Bacillus subtilis, Bacillus circulans, Bacillus globisporus, Bacillus firmus, Bacillus thuringiensis, Bacillus cereus, Bacillus amyloliquefaciens, Bacillus* fimms strain I-1582 (Votivo and Nortica; Bayer), *Bacillus licheniformis. Bacillus lichenformis, Bacillus pumilus, Bacillus subtilis* strains, *Bacillus subtilis, Bacillus amyloliquefaciens Bacillus pumilus, Bacillus thuringiensis* galleriae, *Bacillus thuringiensis* susp kurstaki, *Bacillus cereus, Bacillus subtilis, Bacillus thuringiensis, Bacillus sphaericus, Bacillus megaterium, B. vallismortis,* xxxi) Species of Plant Growth Promoting Rhizobacteda (PGPRs} and strains thereof, including:

(1) one or more *Gluconacetabacter* species selected from the group consisting of: *Gluconacetobacter diazotrophicus* a,k.a, *Acetobacter* diazatrophicus, (2) one or more *Spirillum* species selected from the group consisting of: Spirillmn *lipoferum,*

(3) one or more *Azospirillum* species selected from the group consisting of: Herbaspirillwn seropedicae, (4) one or more *Azoarcus* species (5) one or more *Azotobacter* species selected from the group consisting of: *Burkholderia, Burkhalderia* sp., *Paenibacillus polymyxa,* xxxii) N-fixing bacterial species and strains thereof, including (1) one or more *Rhizobium* species (2) one or more *Bradyrhizobium* species selected from the group consisting of: *Bradyrhizobium japonicum, Rhizobium meliloti* xxxiii) Microbial species and strains thereof that are known to improve nutrient use efficiency, including (1) one or more *Penicillium* species selected from the group consisting of: *Penicillium bilaii, Penicillium bilaji, Mesorhizobium cicero,* xxxiv) Bacterial species and strains thereof from the group termed Pink-Pigmented Facultative Methylotrophs including *Methylobacterium* species.

In an embodiment, the additive's composition further comprises surfactants, buffers, fragrance/odor masking agents, colorants, micro-nutrients, dispersed nitrification inhibitors and/or flow modifiers.

In an embodiment, the NOSDS further comprises the following criteria a. Is environmentally safe;

b. Have flashpoints above 145° F.;

c. Is inherently rated safe for contact with humans and animals;

d. Forms a liquid solution at 20-70° C. of urease inhibitors comprising a composition consisting of a % weight ratio of NOSDS at 50-10% to urease inhibitors at 50-90 for coating the surfaces of nitrification inhibitors with urease inhibitors e. Provides an even and effective coating of urease inhibitor to the surfaces of nitrification inhibitors granules and powders while not causing clumping of the granules or powder.

f. Assisting the coated nitrification inhibitor granules and powders to easily dissolve in water or aqueous fertilizers resulting in a clear and stable solution ready for application to plants and to soil.

In an embodiment, the additive's composition further comprises 0.1-10 weight % of said dry, flowable additive added to an aqueous fertilizer solution to form a homogeneous and stable composition of urease inhibitors, nitrification inhibitors, fertilizer components and water In an embodiment, the additive's composition further comprises blends with liquid or solid manmade fertilizer, manure, waste or compost.

In an embodiment, the additive's composition further comprises an aqueous solution of the 0.1-10 weight % of said additive added to manure, waste or compost.

In an embodiment, the additive's composition consists of <5.0% water.

In an embodiment, a method of preparing the additive comprises: a. Suspending or making a solution of urease inhibitor(s) in a NOSDS at temperatures 20-70° C. wherein the urease inhibitor is in the % weight range of about 50 to 90%; b. In a separated vessel, placing powder or granular nitrification inhibitor(s) under agitation at 20-70° C.; c. Slowly adding the slurry or solution of the urease inhibitor(s) from "a" to powder or granules of nitrification inhibitor(s) and mixing until the urease inhibitor(s) in NOSDS has uniformly coated the nitrification inhibitor(s) wherein the composition's weight percent comprises 80-99% nitrification inhibitor(s), 18-0.5% urease inhibitor(s) and 10-0.2% NOSDS. In a variation the additive's composition comprises adding a flow modifier to improve handling properties and wherein the additive is a dry, flowable solid.

The following Examples are presented to illustrate certain embodiments of the present invention.

Example 1

6.84 grams of dimethyl sulfoxide, 0.06 grams of triethanolamine and 0.11 grams of FD&C Blue #1 were charged to a vessel, placed under agitation and then heated to 60° C. 33.0 grams of N-(n-butyl)thiophosphoric triamide was then slowly charged to the vessel, and mixed at 45-55 C until completely dissolved. Once dissolved, the mixture was prepared for application to the surface of a powder or granular nitrification inhibitor.

Example 2

5.44 grams of dimethyl sulfoxide, 0.06 grams of triethanolamine, 1.4 grams of propylene glycol and 0.11 grams of FD&C Blue #1 were charged to a vessel, placed under agitation and then heated to 60° C. 33.0 grams of N-(n-butyl)thiophosphoric triamide was then slowly charged to the vessel, and mixed at 45-55 C until completely dissolved. Once dissolved, the mixture was prepared for application to the surface of a powder or granular nitrification inhibitor.

Example 3

7.0 grams of propylene glycol were charged to a vessel, placed under agitation and then heated to 60° C. 33.0 grams of N-(n-butyl)thiophosphoric triamide was then slowly charged to the vessel, and mixed at 45-55 C until completely dissolved. Once dissolved, the mixture was prepared for application to the surface of a powder or granular nitrification inhibitor.

Example 4

5.44 grams of dimethyl sulfoxide, 0.06 grams of triethanolamine, 1.4 grams of ethylene glycol and 0.11 grams of FD&C Blue #1 were charged to a vessel, placed under agitation and then heated to 60° C. 33.0 grams of N-(n-butyl)thiophosphoric triamide was then slowly charged to the vessel, and mixed at 45-55 C until completely dissolved. Once dissolved, the mixture was prepared for application to the surface of a powder or granular nitrification inhibitor.

Example 5

4.48 grams of dimethyl sulfoxide, 0.05 grams of triethanolamine, 1.4 grams of glycerin and 0.11 grams of FD&C Blue #1 were charged to a vessel, placed under agitation and then heated to 60° C. 34.0 grams of N-(n-butyl)thiophosphoric triamide was then slowly charged to the vessel, and mixed at 45-55 C until completely dissolved. Once dissolved, the mixture was prepared for application to the surface of a powder or granular nitrification inhibitor.

Example 6

5.44 grams of dimethyl sulfoxide, 0.06 grams of triethanolamine, 1.4 grams of tripropylene glycol methyl ether (TPM) and 0.11 grams of FD&C Blue #1 were charged to a vessel, placed under agitation and then heated to 60° C. 33.0 grams of N-(n-butyl)thiophosphoric triamide was then slowly charged to the vessel, and mixed at 45-55 C until completely dissolved. Once dissolved, the mixture was prepared for application to the surface of a powder or granular nitrification inhibitor.

Example 7

5.44 grams of dimethyl sulfoxide, 0.06 grams of triethanolamine, 1.4 grams of ethyl lactate and 0.11 grams of FD&C Blue #1 were charged to a vessel, placed under agitation and then heated to 60° C. 33.0 grams of N-(n-butyl)thiophosphoric triamide was then slowly charged to the vessel, and mixed at 45-55 C until completely dissolved. Once dissolved, the mixture was prepared for application to the surface of a powder or granular nitrification inhibitor.

Example 8

5.44 grams of dimethyl sulfoxide, 0.06 grams of triethanolamine, 1.4 grams of triethylphosphate and 0.11 grams of FD&C Blue #1 were charged to a vessel, placed under agitation and then heated to 60° C. 33.0 grams of N-(n-butyl)thiophosphoric triamide was then slowly charged to the vessel, and mixed at 45-55 C until completely dissolved. Once dissolved, the mixture was prepared for application to the surface of a powder or granular nitrification inhibitor.

Example 9

5.44 grams of dimethyl sulfoxide, 0.06 grams of triethanolamine, 1.4 grams of polyethylene glycol 400 and 0.11 grams of FD&C Blue #1 were charged to a vessel, placed under agitation and then heated to 60° C. 33.0 grams of N-(n-butyl)thiophosphoric triamide was then slowly charged to the vessel, and mixed at 45-55 C until completely dissolved. Once dissolved, the mixture was prepared for application to the surface of a powder or granular nitrification inhibitor.

Example 10

4.48 grams of dimethyl sulfoxide, 0.05 grams of triethanolamine, 1.4 grams of dipropylene glycol methyl ether acetate and 0.11 grams of FD&C Blue #1 were charged to a vessel, placed under agitation and then heated to 60° C. 34.0 grams of N-(n-butyl)thiophosphoric triamide was then slowly charged to the vessel, and mixed at 45-55 C until completely dissolved. Once dissolved, the mixture was prepared for application to the surface of a powder or granular nitrification inhibitor.

Example 11

4.48 grams of dimethyl sulfoxide, 1.5 grams of triethanolamine and 0.11 grams of FD&C Blue #1 were charged to a vessel, placed under agitation and then heated to 60° C. 34.0 grams of N-(n-butyl)thiophosphoric triamide was then slowly charged to the vessel, and mixed at 45-55 C until completely dissolved. Once dissolved, the mixture was prepared for application to the surface of a powder or granular nitrification inhibitor.

Example 12

4.48 grams of dimethyl sulfoxide, 0.05 grams of triethanolamine, 1.4 grams of propylene carbonate and 0.11 grams of FD&C Blue #1 were charged to a vessel, placed under agitation and then heated to 60° C. 34.0 grams of N-(n-butyl)thiophosphoric triamide was then slowly charged to the vessel, and mixed at 45-55 C until completely dissolved. Once dissolved, the mixture was prepared for application to the surface of a powder or granular nitrification inhibitor.

Example 13

4.48 grams of dimethyl sulfoxide, 0.05 grams of triethanolamine, 1.4 grams of dimethyl glutarate and 0.11 grams of FD&C Blue #1 were charged to a vessel, placed under agitation and then heated to 60° C. 34.0 grams of N-(n-butyl)thiophosphoric triamide was then slowly charged to the vessel, and mixed at 45-55 C until completely dissolved. Once dissolved, the mixture was prepared for application to the surface of a powder or granular nitrification inhibitor.

Example 14

4.48 grams of dimethyl sulfoxide, 0.05 grams of triethanolamine, 1.4 grams of sorbitol and 0.11 grams of FD&C Blue #1 were charged to a vessel, placed under agitation and then heated to 60° C. 34.0 grams of N-(n-butyl)thiophosphoric triamide was then slowly charged to the vessel, and mixed at 45-55 C until completely dissolved. Once dissolved, the mixture was prepared for application to the surface of a powder or granular nitrification inhibitor.

Example 15

4.48 grams of dimethyl sulfoxide, 0.05 grams of triethanolamine, 1.4 grams of isopropylidene glycerol and 0.11 grams of FD&C Blue #1 were charged to a vessel, placed under agitation and then heated to 60° C. 34.0 grams of N-(n-butyl)thiophosphoric triamide was then slowly charged to the vessel, and mixed at 45-55 C until completely dissolved. Once dissolved, the mixture was prepared for application to the surface of a powder or granular nitrification inhibitor.

Example 16

7.0 grams of propylene carbonate were charged to a vessel, placed under agitation and then heated to 60° C. 33.0 grams of N-(n-butyl)thiophosphoric triamide was then slowly charged to the vessel, and mixed at 45-55 C until completely dissolved. Once dissolved, the mixture was prepared for application to the surface of a powder or granular nitrification inhibitor.

Example 17

5.44 grams of tetramethylene sulfoxide, 0.06 grams of triethanolamine, 1.4 grams of propylene glycol and 0.11 grams of FD&C Blue #1 were charged to a vessel, placed under agitation and then heated to 60° C. 33.0 grams of N-(n-butyl)thiophosphoric triamide was then slowly charged to the vessel, and mixed at 45-55 C until completely dissolved. Once dissolved, the mixture was prepared for application to the surface of a powder or granular nitrification inhibitor.

Example 18

6.84 grams of dimethyl formamide, 0.06 grams of triethanolamine and 0.11 grams of FD&C Blue #1 were charged to a vessel, placed under agitation and then heated to 60° C. 33.0 grams of N-(n-butyl)thiophosphoric triamide was then slowly charged to the vessel, and mixed at 45-55 C until completely dissolved. Once dissolved, the mixture was prepared for application to the surface of a powder or granular nitrification inhibitor.

Example 19

5.44 grams of tetramethylene sulfone (sulfolane), 0.06 grams of triethanolamine, 1.4 grams of propylene glycol and 0.11 grams of FD&C Blue #1 were charged to a vessel, placed under agitation and then heated to 60° C. 33.0 grams of N-(n-butyl)thiophosphoric triamide was then slowly charged to the vessel, and mixed at 45-55 C until completely dissolved. Once dissolved, the mixture was prepared for application to the surface of a powder or granular nitrification inhibitor.

Example 51

6.9 grams of dimethyl sulfoxide, and 0.11 grams of FD&C Blue #1 were charged to a vessel, placed under agitation and then heated to 60° C. 33.0 grams of N-(n-butyl)thiophosphoric triamide was then slowly charged to the vessel, and mixed at 45-55 C until completely dissolved. Once dissolved, the mixture was prepared for application to the surface of a powder or granular nitrification inhibitor. (Note: Table 1 has been split into Table 1a and 1b to accommodate the amount of data)

TABLE 1a

Chart of NBPT Examples 1-10

| Examples | 1 | 2 | 3 | 4 | 5 | 6 | 7 | 8 | 9 | 10 |
|---|---|---|---|---|---|---|---|---|---|---|
| NBPT | 33.0 | 33.0 | 33.0 | 33.0 | 34.0 | 33.0 | 33.0 | 33.0 | 33.0 | 34.0 |
| DMSO | 6.84 | 5.44 | | 5.44 | 4.48 | 5.44 | 5.44 | 5.44 | 5.44 | 4.48 |
| Blue dye | 0.11 | 0.11 | | 0.11 | 0.11 | 0.11 | 0.11 | 0.11 | 0.11 | 0.11 |
| Propylene Glycol | | 1.4 | 7 | | | | | | | |
| Ethylene Glycol | | | | 1.4 | | | | | | |
| Glycerin | | | | | 1.4 | | | | | |
| TPM | | | | | | 1.4 | | | | |
| Ethyl Lactate | | | | | | | 1.4 | | | |
| PEG 400 | | | | | | | | | 1.4 | |
| DPMAc | | | | | | | | | | 1.4 |
| Triethanolamine | 0.06 | 0.06 | | 0.06 | 0.05 | 0.06 | 0.06 | 0.06 | 0.06 | 0.05 |
| Propylene Carbonate | | | | | | | | | | |
| Dimethyl Glutarate | | | | | | | | | | |
| Sorbitol | | | | | | | | | | |

TABLE 1a-continued

Chart of NBPT Examples 1-10

| Examples | 1 | 2 | 3 | 4 | 5 | 6 | 7 | 8 | 9 | 10 |
|---|---|---|---|---|---|---|---|---|---|---|
| triethyl phosphate | | | | | | | | 1.4 | | |
| Isopropylidene Glycerol | | | | | | | | | | |
| Tetramethylene sulfoxide | | | | | | | | | | |
| Dimethyl formamide | | | | | | | | | | |
| Tetramethylene sulfone | | | | | | | | | | |
| Total | 40.0 | 40.0 | 40.0 | 40.0 | 40.0 | 40.0 | 40.0 | 40.0 | 40.0 | 40.0 |
| % NBPT | 80.0 | 80.0 | 80.0 | 80.0 | 82.4 | 80.0 | 80.0 | 80.0 | 80.0 | 82.4 |
| Dispersion Stability @ 50 C. | 1 | 1 | 4 | 1 | 2 | 1 | 1 | 1 | 1 | 2 |

Stability rating: 1 = stable, 5 = split @6 hrs/50 C.
NBPT = N-(n-butyl)thiophosphoric triamide;
DMSO = dimethyl sulfoxide;
Blue Dye = FD&C Blue #1;
TPM = Tripropylene glycol monomethyl ether;
PEG 400 = polyethylene glycol/molecular weight of 400 units;
DPMAc = Dipropylene glycol monomethyl ether acetate capped TABLE 1b Chart of NBPT Examples 11-20

| Examples | 11 | 12 | 13 | 14 | 15 | 16 | 17 | 18 | 19 | 51 |
|---|---|---|---|---|---|---|---|---|---|---|
| NBPT | 34.0 | 34.0 | 34.0 | 34.0 | 34.0 | 33.0 | 33.0 | 33.0 | 33.0 | 33.0 |
| DMSO | 4.48 | 4.48 | 4.48 | 4.48 | 4.48 | | | | | 6.89 |
| Blue dye | 0.11 | 0.11 | 0.11 | 0.11 | 0.11 | .11 | .11 | .11 | .11 | 0.11 |
| Propylene Glycol | | | | | | | 1.4 | | 1.4 | |
| Ethylene Glycol | | | | | | | | | | |
| Glycerin | | | | | | | | | | |
| TPM | | | | | | | | | | |
| Ethyl Lactate | | | | | | | | | | |
| PEG 400 | | | | | | | | | | |
| DPMAc | | | | | | | | | | |
| Triethanolamine | 1.5 | 0.05 | 0.05 | 0.05 | 0.05 | | | | | |
| Propylene Carbonate | | 1.4 | | | | 7 | | | | |
| Dimethyl Glutarate | | | 1.4 | | | | | | | |
| Sorbitol | | | | 1.4 | | | | | | |
| triethyl phosphate | | | | | | | | | | |
| Isopropylidene Glycerol | | | | | 1.4 | | | | | |
| Tetra methylene sulfoxide | | | | | | | 5.44 | | | |
| Dimethyl formamide | | | | | | | | 6.84 | | |
| Tetramethylene sulfone | | | | | | | | | 5.44 | |
| Total | 40.0 | 40.0 | 40.0 | 40.0 | 40.0 | 40.0 | 40.0 | 40.0 | 40.0 | 40 |
| % NBPT | 82.4 | 82.4 | 82.4 | 82.4 | 82.4 | 80.0 | 80 | 80 | 80 | 80 |
| Dispersion Stability @ 50 C. | 3 | 1 | 1 | 1 | 1 | 5 | 1 | 1 | 1 | 1 |

Stability rating 1 = stable, 5 = split @6 hrs/50 C.
NBPT = N-(n-butyl)thiophosphoric triamide;
DMSO = dimethyl sulfoidde;
Blue Dye = FD&C Blue #1;
TPM = Tripropylene glycol monomethyl ether;
PEG 400 = polyethylene glycol/molecular weight of 400 units;
DPMAc = Dipropylene glycol monomethyl ether acetate capped The examples of the urease inhibitor/NOSDS formulations innovations demonstrate the flexibility technology in producing stable, liquid samples with concentrations of 80-83% of urease inhibitors. The procedure for producing Examples 20-45 is as follows:

1. 186.1 grams of solid powder or granular nitrification inhibitor were heated to 60° C. in a glass vessel and mixed using an overhead stirrer with anchor agitator.
2. 13.90 grams of one of the formulations from the Examples 1-20 @ 45-55 C was slowly dripped onto the agitating solid powder or granular nitrification inhibitor.
3. The combination was mixed at 60 RPMs for 120 seconds and then poured into an 16 oz. jar and tapped on the table top 5 times
4. The coated solid powder or granular nitrification inhibitor was evaluated for flow, quality of urease inhibitor coating, time for dissolution in distilled water and in a 30% UAN solution (urea/ammonium nitrate solution in water).

The "coating quality rating" was based on a visual assessment of coverage of nitrification particles by utilizing the incorporated blue dye. Ratings were from 1-5 where 1=poor coverage showing large patches of non-blue particles versus 5=excellent coverage as determined by the continuity of the blue color and no non-blue patches.

The "packing flowability rating" was based on a visual assessment of:

1. Pouring 200 grams of coated nitrification particles into a quart jar and capping with lid.
2. Sharply tapping the quart jar on a hard surface five times
3. After 24 hours of setting at room temperature, flip jar over. If material remains in the jar's original bottom, a small spatula's wooded handle is used to gently tap the jar's bottom.
4. Ratings were from 1-5 where 1=poor flowability where material did not fall after 5 taps versus 5=excellent flowability where all the material falls without a tap.

TABLE 2

Urease Formulation Coating Performance
Coating Performance on Nitrification Inhibitors

| Example # | Coating Example # | Nitrification inhibitor | Coating rating: 1 = poor; 5 = full coating | Flowability Rating: 1 = lumps and poor flow; 5 = good flow (1 tap max) |
|---|---|---|---|---|
| 20 | 1 | DCD | 5 | 3 |
| 21 | 2 | DCD | 5 | 5 |
| 22 | 4 | DCD | 5 | 4 |
| 23 | 5 | DCD | 5 | 3 |
| 24 | 6 | DCD | 5 | 3 |
| 25 | 7 | DCD | 4 | 4 |
| 26 | 9 | DCD | 5 | 2 |
| 27 | 10 | DCD | 5 | 3 |
| 28 | 11 | DCD | 4 | 3 |
| 29 | 12 | DCD | 4 | 3 |
| 30 | 14 | DCD | 4 | 3 |
| 31 | 15 | DCD | 5 | 3 |
| 32 | 16 | DCD | 5 | 3 |
| 33 | 17 | DCD | 5 | 5 |
| 34 | 18 | DCD | 4 | 4 |
| 35 | 19 | DCD | 5 | 5 |
| 36 | 1 | STS | 5 | 2 |
| 37 | 2 | STS | 5 | 1 |
| 38 | 6 | STS | 5 | 4 |
| 39 | 7 | STS | 5 | 1 |

TABLE 2-continued

Urease Formulation Coating Performance
Coating Performance on Nitrification Inhibitors

| Example # | Coating Example # | Nitrification inhibitor | Coating rating: 1 = poor; 5 = full coating | Flowability Rating: 1 = lumps and poor flow; 5 = good flow (1 tap max) |
|---|---|---|---|---|
| 40 | 8 | STS | 5 | 1 |
| 41 | 1 | Np | 5 | 1 |
| 42 | 2 | Np | 5 | 2 |
| 43 | 6 | Np | 5 | 3 |
| 44 | 7 | Np | 5 | 1 |
| 45 | 8 | Np | 5 | 1 |
| 46 | 51 | DCD | 5 | 3 |

^ DCD = Dicyandiamide;
STS = Sodium Thiosulfate;
Np = Nitrapyrin

The performance of the examples of urease inhibitors/NOSDS formulation innovations in coating nitrification inhibitor powders and granules and the flowability of the coated nitrification inhibitors without utilizing flow aid additives demonstrates the ease of use and the commercial viability of the innovation.

Nitrification Inhibitor Coated with Urease Formulation Time to Dissolution

1. In a 4 oz. glass jar add 97 grams of either Deionized (DI) Water or UAN 30.
2. Add a ¾ inch magnetic stir bar and place on a Corning/Model PC-420 Heater/Stirrer and set stirring speed at #7.
3. Charge 3 grams of a nitrification inhibitor coated or uncoated and start stop watch.
4. Visually determine the point at which all particles of the nitrification inhibitor have dissolved and record this time as time to dissolution.

TABLE 3

DCD Coated with an NBPT Concentrate in NOSDS:
Time to Dissolution

| | | DI Water | | UAN 30 | |
|---|---|---|---|---|---|
| Sample ID | % Coated Nitrification | Time to Dissolution (seconds) | Initial Appearance | Time to Dissolution (seconds) | Initial Appearance |
| DCD untreated | 3% | X | X | 1740 | clear |
| Example 21 | 3% | 1170 | clear | 1342 | clear |
| *Commercial Product | 3% | Infinitely insoluble | Cloudy with small particles | Infinite insoluble | Cloudy with small particles |
| Example 20 | 3% | 995 | Clear | 1170 | Clear |
| Example 21 | 3% | 915 | Clear | 1125 | Clear |
| Example 22 | 3% | 885 | Clear | 1220 | Clear |
| Example 23 | 3% | 970 | Clear | 1450 | Clear |
| Example 24 | 3% | 905 | Clear | 1295 | Clear |
| Example 25 | 3% | 975 | Clear | 1265 | Clear |
| Example 26 | 3% | 1000 | Clear | 1365 | Clear |
| Example 27 | 3% | 1030 | Clear | 1265 | Clear |
| Example 28 | 3% | 885 | Clear | 1310 | Clear |
| Example 29 | 3% | 870 | Clear | 1334 | Clear |
| Example 30 | 3% | 890 | Clear | 1185 | Clear |
| Example 31 | 3% | 910 | Clear | 1140 | Clear |
| Example 46 | 3 | 985 | Clear | 1740 | Clear |

*Commercial Product = Agrotain Plus EZ Flow

The performance of the coated DCD examples demonstrates the improved solubility of these innovations over uncoated DCD and over a commercial NBPT/DCD product. The clarity of the coated DCD innovations in a UAN solution will result in improvements in the evenness of application of both urease and nitrification inhibitors. Technologies based on an insoluble urea formaldehyde particle coated with NBPT blended with a dry DCD will result in cloudy UAN solutions that require continuous agitation to maintain homogeneity of the suspended particles. Applying such a UAN solution on a field utilizing standard spraying equipment results in uneven in application of inhibitors

TABLE 4

Ammonium Thiosulfate Coated with an NBPT Concentrate in NOSDS: Time to Dissolution

| | | DI Water | | UAN 30 | |
|---|---|---|---|---|---|
| Sample ID | % Coated Nitrification | Time to Dissolution (seconds) | Initial Appearance | Time to Dissolution (seconds) | Initial Appearance |
| Example 36 | 3% | X | X | 240 | Clear |
| Example 37 | 3% | X | X | 230 | Clear |
| Example 38 | 3% | X | X | 275 | Clear |
| Example 39 | 3% | X | X | 260 | Clear |
| Example 40 | 3% | X | X | 300 | Clear |

To determine what minimum effective levels of DCD are required to meet acceptable levels of nitrification inhibition and to maximize performance versus inhibitor level, studies were performed at Auburn University, South Dakota State University and University of Arkansas. These studies were performed by coating urea with a liquid nitrification inhibitor product, trade name N Bound, which contained approximately 28% DCD. The application rates of N Bound on urea (Units are in quarts of N Bound/ton of urea) was varied to measure application level versus the conversion of urea to nitrate measured as mg $NO_3$ extracted from the applied soil.

Example 47

A trial conducted at University of Arkansas was designed to measure and compare the nitrate concentrations from the microbial activity on untreated urea and ureas coated with N Bound that had been applied to classified as a Calhoun silt loam (pH=7.4) at varying rates. The objective was to determine the minimum inhibitor application rate to achieve optimize nitrification inhibition. The statistical results are listed in Table 5.

TABLE 5

Product application rates and nitrification of urea fertilizer during a 35 day incubation Nitrate-N Concentration (mg $NO_3$—N/kg soil)

| | Day 1 | Day 3 | Day 7 | Day 14 | Day 21 | Day 28 | Day 35 |
|---|---|---|---|---|---|---|---|
| Untreated Soil (check) | 112.2 | 99.4 | 115.4 | 143.7 | 141.4 | 175.8 | 151.2 |
| Urea | 113.4 | 98.6 | 151.6 | 202.8 | 221.2 | 262.3 | 255.3 |
| Urea + Liquid DCD product (4 qt/T) | 111.6 | 97.2 | 141.5 | 199.3 | 223.1 | 271.4 | 259.4 |
| Urea + Liquid DCD product (6 qt/T) | 112.8 | 96.2 | 143.7 | 197.9 | 216.9 | 251.0 | 268.9 |
| Urea + Liquid DCD product (8 qt/T) | 113.1 | 99.4 | 139.9 | 176.8 | 203.1 | 245.8 | 258.3 |

The results of the trial show nitrification control through 21 days at a rate of 8 qt N-Bound/ton is used.

Example 48

A trial conducted at the South Dakota State was designed to measure and compare the nitrate concentrations from the microbial activity on untreated urea and ureas coated with N Bound that had been applied to Midwestern soil at varying rates. The graph in FIG. 1 shows the results of the experiment. The results of the experiment conclude that N Bound applied at 7 lbs/ton or more resulted in more plant available nitrogen (ammonium and nitrate nitrogen after 35 days of storage versus lower N Bound application levels.

Example 49

Figure 2:
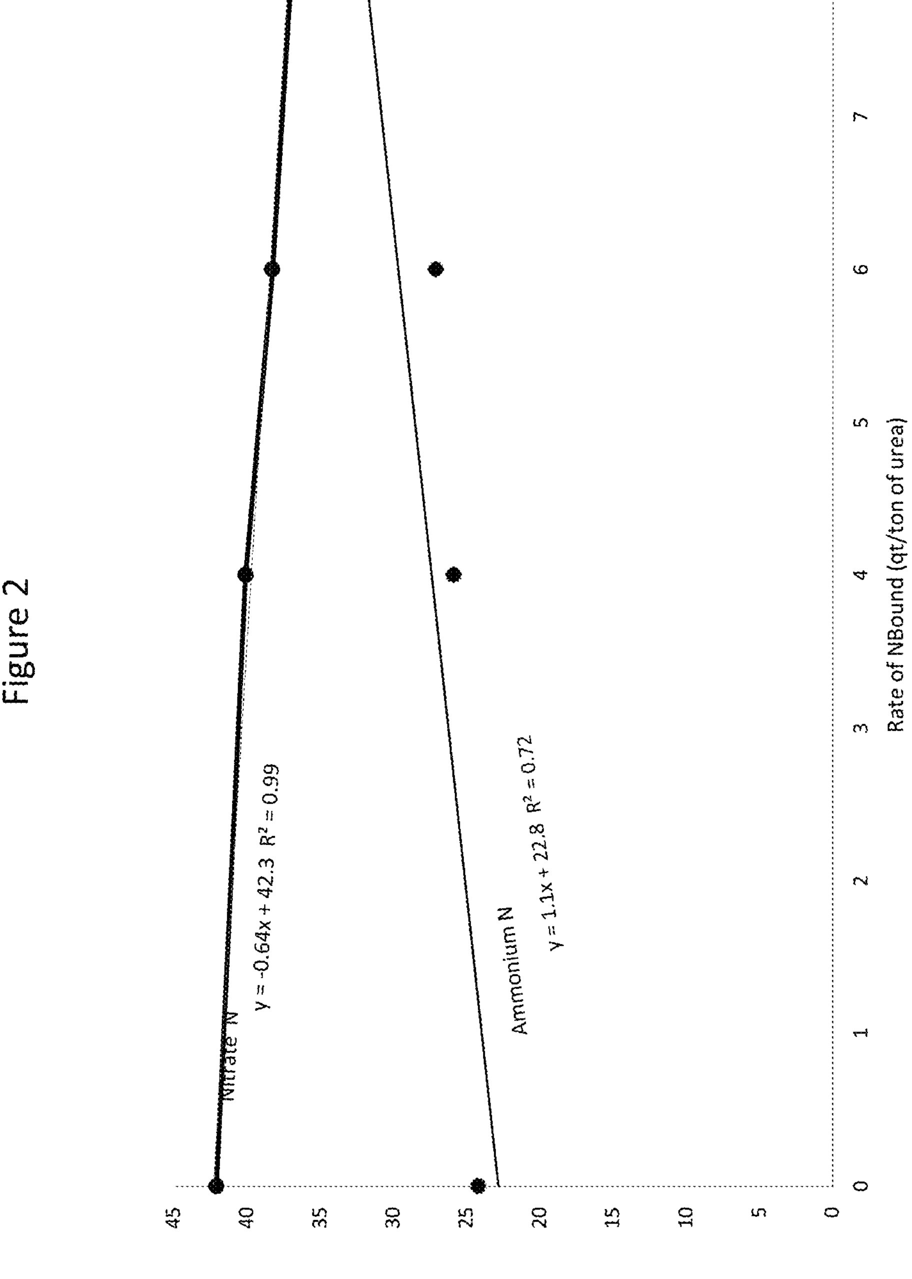
FIG. 2: 2M KCl extraction of soil for presence of $NH_4$—N and $NO_3$—N to determine impact of rate of liquid containing nitrification inhibitor addition. Data collected is the average of 8 weeks of soil extractions.

A trial conducted at the Auburn University was designed to measure and compare the nitrate and ammonical nitrogen concentrations from the microbial activity on untreated urea and ureas coated with N Bound that had been applied a wetted Marvyn loamy sand, (approximately 80% sand) at varying rates. The graph in FIG. 2 shows the results of the experiment. The results of the experiment conclude that in the 8 week incubation study, N Bound applied to urea at 8 qts/Ton of urea exhibited significant nitrification inhibitory properties versus lower N Bound application levels.

Table 6 shows the conversion of the data in Example 46, 47, and 48 of N Bound application levels to percentages of N Bound on urea. Table 2 also converts N Bound application levels to DCD application levels on urea and on the basis of the nitrogen present in urea.

TABLE 6

| Testing Entity | *Quarts of N Bound/ ton of urea | **% N Bound on urea | ***% DCD on urea | **** % DCD based on nitrogen content of urea |
|---|---|---|---|---|
| South Dakota State University | 7 | 0.84% | 0.24% | 0.51% |
| Auburn University | 8 | 0.97% | 0.27% | 0.59% |
| University of Arkansas | 8 | 0.97% | 0.27% | 0.59% |

*N Bound (trade name of EcoAgo Resources) is DCD dispersed in a non-aqueous solvent system.
**Specific gravity of N Bound (lbs/gal) = 9.6512
***% DCD = 28%
**** % N in urea = 46%

For dry urea, liquid systems containing DCD have the advantage of even distribution of inhibitors over the surface of urea. Liquid products containing and urease and nitrification inhibitors offer the same benefit. However, the drawback is that coating levels exceeding 0.75% of current liquid systems have processability issues in mixing and application equipment with the formation of clogs and high level of deposition of the fertilizer requiring more frequent cleaning and the formation of clumps of fertilizer impacting evenness of application. Coating levels of <0.75% of such a liquid product can be achieved with application of a maximum of 6 qts liquid product/ton of urea. However, this results in an application level of DCD at 0.20% which is below the minimum effective level as established in the above studies.

Example 50

Figure 3:
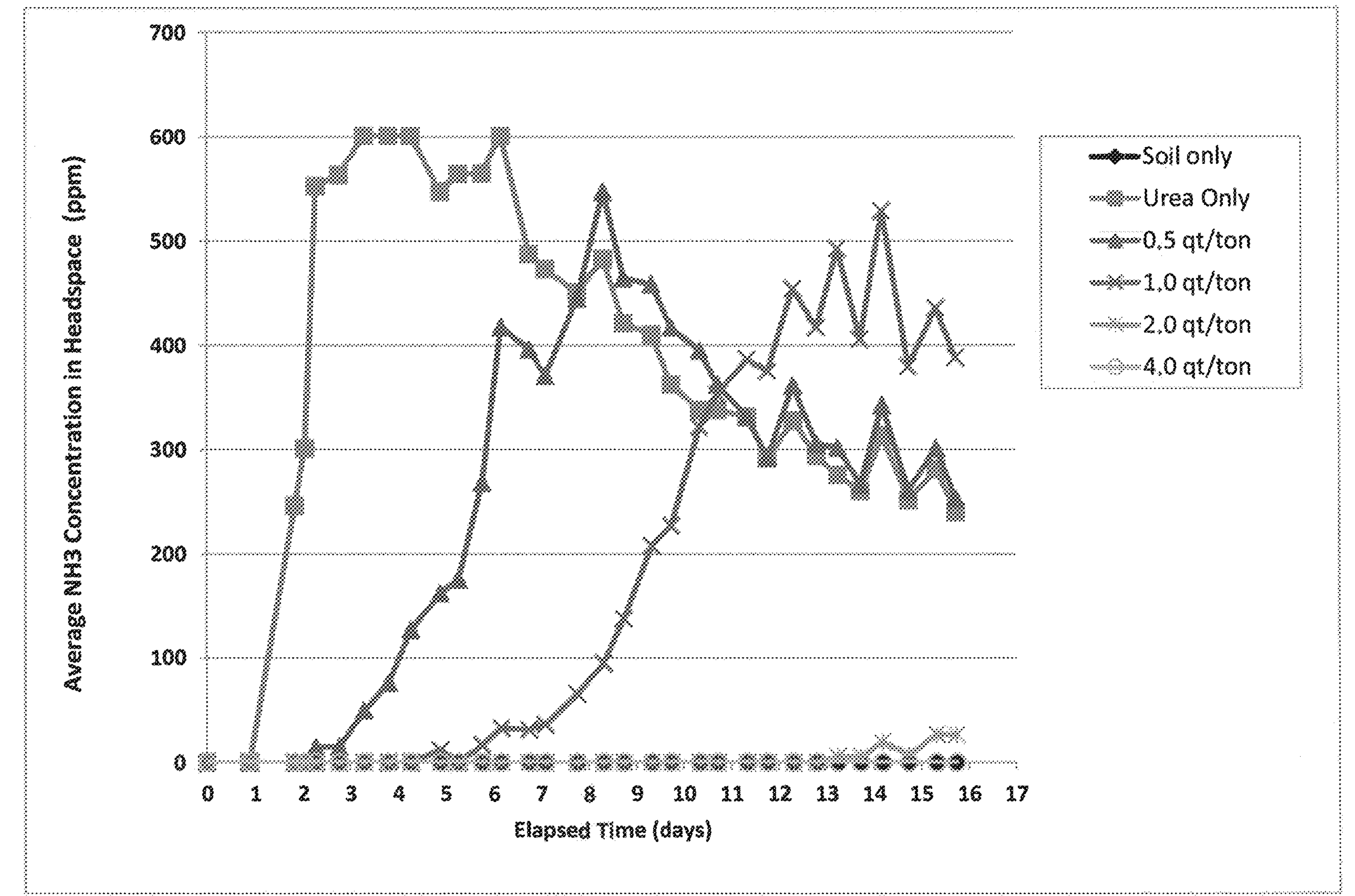
FIG. 3: Average of headspace analysis for $NH_3$ to determine impact of rate of liquid containing urease inhibitor addition. Data was collected over a 16 day period.

A trial conducted at the West Texas State University was designed to measure and compare the headspace analysis of ammonia concentrations formed from urease activity on untreated urea and ureas coated with N Yield that had been applied western US soils at varying rates. The graph in FIG. 3 shows the results of the experiment. The results of the experiment conclude N Yield applied to urea at 2 qts/Ton of urea exhibited significant urease inhibitory properties versus lower N Yield application levels. Table 7 shows the conversion of the data in FIG. 3 of N Yield application levels to percentages of N Yield on urea. Table 7 also converts N Yield application levels to NBPT application levels on urea and on the basis of the nitrogen present in urea.

TABLE 7

| Testing Entity | *Quarts N Yield/ton of urea | **% liquid NBPT on urea | **% NBPT on urea | **** % NBPT required for nitrogen content of urea |
|---|---|---|---|---|
| West | 0.5 | 0.06% | 0.02% | 0.03% |
| Texas | 1 | 0.11% | 0.03% | 0.07% |
| State | 2 | 0.23% | 0.06% | 0.13% |
| University | 4 | 0.45% | 0.12% | 0.26% |

*N Yield (trade name of EcoAgro Resources) is NBPT dispersed in a non-aqueous solvent system.

**Specific gravity of N Yield (lbs/gal) = 9.08

***% NBPT = 26.7%

**** % N in urea = 46%

For dry urea, liquid systems containing NBPT have the advantage of even distribution of inhibitors over the surface of urea. Liquid products containing and urease and nitrification inhibitors offer the same benefit. However, while liquid coating containing NBPT are well under the 0.75% level, coating urea with both DCD and urease inhibitors require application levels that exceed 0.75%. This results in coated urea having processability issues in mixing and application equipment with the formation of clogs and high level of deposition of the fertilizer requiring more frequent cleaning and the formation of clumps of fertilizer impacting evenness of application.

Example 51

A sample of (hexylaminomethylene, aminomethylene) phosphinic acid, ($C_8H_{20}N_2O_2P$), was prepared by charging 132 grams of hypophosphorous acid/50% water to a reaction vessel and then charging 60 grams of paraformaldehyde while agitating. Cooling was applied to assist in maintaining the temperature below 50° C. The composition was then heated to 70° C. and held at 70° C. until the composition cleared. The temperature was cooled to 25-30° C. and then 101.19 grams of hexylamine was slowly charged in order to maintain the temperature <40 C. After completing the hexylamine charge, temperature was raised to 70° C. over a two hour period and then held for one hour or until composition's appearance became clear. Once appearance became clear, a sub-surface charging of ammonia gas began. The $NH_3$ sparge continued at a temperature of 70° C. until the composition's 10% pH reached 7.5-8.5 and then the composition was then heated to 90° C. over a one hour period. During this time, the composition's 10% pH was held at 7.5-8.5 by adjusting the pH through ammonia sparging. The composition was held at 90° C. for one hour while maintain 10% pH at 7.5-8.5 by adjusting the pH through ammonia sparging. After 1 hour at 90° C., vessel pressure was reduced through application of a vacuum until the pressure reading was 80-100 mm Hg to strip out excess ammonia and some water until distillation stopped.

Example 52

A sample of (hexylaminomethylene, aminomethylene) phosphinic acid, ($C_8H_{20}N_2O_2P$), was prepared by charging 132 grams of hypophosphorous acid/50% water and 20 grams propylene carbonate to a reaction vessel. Reaction vessel was heated to 70° C. and water stripped out until % moisture ≤5% under reduced pressure. After composition was cooled to 30-40° C., the reaction proceeded with charging 46 grams of dimethyl sulfoxide and then slowly charging 60 grams of trioxane while agitating. The composition was then heated to 70° C. and held at 70° C. until the composition cleared. The temperature was cooled to 25-30° C. and then 101.19 grams of hexylamine was slowly charged in order to maintain the temperature <40° C. After completing the hexylamine charge, the temperature was raised to 70° C. over a two hour period and then held for one hour or until the composition's appearance became clear. Once the appearance became clear, a sub-surface charging of ammonia gas began. The $NH_3$ sparge continued at a temperature of 70° C. until the composition's 10% pH reached 7.5-8.5 and then the composition was then heated to 90° C. over a one hour period. During this time, the composition's 10% pH was held at 7.5-8.5 by adjusting the pH through ammonia sparging. The composition was held at 90° C. for one hour while maintain 10% pH at 7.5-8.5 by adjusting the pH through ammonia sparging. After 1 hour at 90° C., the vessel pressure was reduced through application of a vacuum until the pressure reading was ≤20 mm Hg to strip out excess ammonia and water. The vacuum was maintained until distillation ceased and % moisture was less than 5%. The 10% pH was rechecked and extra $NH_3$ gas was sparged to adjust the pH to 7.5-8.0. The composition was cooled and packaged.

Example 53

120 grams of Example 51 and 36 grams of ethylene glycol were charged to a reaction vessel and heated to 90° C. The vessel pressure was reduced through application of a vacuum until the pressure reading was ≤20 mm Hg to strip out excess ammonia and water. The vacuum was maintained until distillation ceased and % moisture was less than 5%. The composition was cooled and packaged.

Example 54

Ammonia Volatilization Screening Test for Urease Inhibitors Before testing example Nos 51 and 52 performances as a coating on nitrification inhibitor granules, the examples were validated for performance as urease inhibitors by comparing the ammonia volatilization of treated urea versus untreated urea. The treated urea was prepared as follows:

Sample Preparation for Application to Urea

Example 55

Example 52 actives were adjusted to 30% by dilution with DMSO.

Example 56

Example 53 actives were adjusted to 30% by dilution with DMSO

Example 57

Example 51 actives were adjusted to 30% by dilution with 50/50 DMSO/Water

Example 58

30.92 grams N-(n-butyl) thiophosphoric triamide was dissolved in 69.08 grams of a 50/50 DMSO/propylene glycol Examples Application to Urea Urea was Coated with an Example by:

1. Charging weight of urea as directed by Table 8 to a container.
2. The urea was slowly agitated with overhead stirrer with U shaped agitator blade.
3. The example was slowly dripped on the urea while mixing in the amount as directed by Table 8 (rate=3 quarts/ton of urea).
4. When the proper weight of the example had been charged the mixing speed was increased to ensure adequate coating of the urea by the example.
5. The coated urea was placed in a jar and sealed.

TABLE 8

| Formulation for treating urea | | | | |
|---|---|---|---|---|
| Compound | Example 59 | Example 60 | Example 61 | Example 62 |
| Urea | 199.28 grams | 199.28 | 199.28 | 199.28 |
| Example 55 | 0.72 grams | | | |
| Example 56 | | 0.72 grams | | |
| Example 57 | | | 0.72 grams | |
| Example 58 | | | | 0.72 grams |

Preparing Test Soil

1. In a 6"×9" rectangular Tupperware sealable container with holes drilled on each end and sealed with tape charge 400 grams of West Texas Sandy Loam Soil and 100 grams of distilled water, mix thoroughly to a consistency of thick "mud" (% moisture should be between 30-40%).
2. Calculate the surface area to be treated.
   a. 6"×9.5"=sq in/1 44 sq in/sq ft=0.395 sq ft
   b. 0.395 sq ft/43,560 sq ft/acre=0.0000091 acres
3. Calculate amount of urea and treated urea to charge to the containers of soil
   a. Application Rate: 400 pounds urea per acre
   b. 400 lbs/acre/43560 sq ft/acre=0.009 lbs/sq ft×0.395 sq ft/container=0.0036 lbs/container×454 g/lb=1.65 grams urea per container.
   c. Add 1.65 grams of urea and various treated ureas to each container
4. Ammonia Volatilization Screening Test
   a. Evenly distribute over the soil in each container 1.65 grams of example to be tested,
   b. Seal container,
   c. Take readings of ammonia volatilization of each container over a selected period of time as directed in Table 9,
      i. Drager tube measurement
         (1) Use Drager pump with 0-600 ppm (or range TBD) ammonia drager tube.
         (2) At specified times, quickly remove the tape on one end of container and insert the drager tube/pump.
         (3) Fully squeeze pump 20 times allowing enough time for pump to fully inflate between each squeeze and then remove the tube from the container and read.
         (4) Open container lid and vent the remaining ammonia gas out of the container and reseal.
         (5) Repeat procedure at next designated time.

TABLE 9

| Ammonia Volatilization Test Results | | | |
|---|---|---|---|
| | Ammonia Reading (ppm) | | |
| Example ID | 72 hours | 144 hours | 264 hours |
| Urea | 220 | 475 | 460 |
| # 59 | 50 | 120 | 200 |
| # 61 | 50 | 110 | 220 |
| # 62 | 90 | 210 | 600 |

The performance of the examples of the new urease inhibitors/NOSDS formulations in slowing the generation of ammonia from the degradation of urea by urease enzyme show these examples perform better than the standard urease inhibitor N-(n-butyl) thiophosphoric triamide.

The procedure for producing DCD coated examples from examples 51-53 is as follows:

1. 186.1 grams of solid powder or granular nitrification inhibitor were heated to 60° C. in a glass vessel and mixed using an overhead stirrer with anchor agitator.
2. 13.90 grams of one of the formulations from the Examples 51-53 @ 45-55° C. was slowly dripped onto the agitating solid powder or granular nitrification inhibitor.
3. The combination was mixed at 60 RPMs for 120 seconds and then poured into an 16 oz. jar and tapped on the table top 5 times.
4. The coated solid powder or granular nitrification inhibitor was evaluated for flow, quality of urease inhibitor coating.

The "coating quality rating" was based on a visual assessment of coverage of nitrification particles by utilizing the incorporated blue dye. Ratings were from 1-5 where 1=poor coverage showing large patches of non-blue particles versus 5=excellent coverage as determined by the continuity of the blue color and no non-blue patches.

The "packing flowability rating" was based on a visual assessment of:

5. Pouring 200 grams of coated nitrification particles into a quart jar and capping with lid.
6. Sharply tapping the quart jar on a hard surface five times.
7. After 24 hours at room temperature, flip jar over. If material remains in the jar's original bottom, a small spatula's wooded handle is used to gently tap the jar's bottom.
8. Ratings were from 1-5 where 1=poor flowability where material did not fall after 5 taps versus 5=excellent flowability where all the material falls without a tap.

Urease Formulation Coating Performance

TABLE 10

Coating Performance on Nitrification Inhibitors

| Example # | Nitrification inhibitor | Coating rating: 1 = poor; 5 = full coating | Flowability Rating: 1 = lumps and poor flow; 5 = good flow (1 tap max) |
|---|---|---|---|
| 51 | DCD | 3 | 3 |
| 52 | DCD | 5 | 4 |
| 53 | DCD | 5 | 5 |

^ DCD = Dicyandiamide

Example #53 showed the best performance of the 3 examples of urease inhibitors/NOSDS formulation in coating nitrification inhibitor particles. The resulting flowability of the coated nitrification inhibitors without utilizing flow aid additives demonstrates the ease of use. Example 51 shows the negative impact of water on coating and on flowability.

In an embodiment, the composition of a liquid formulation comprises a) NOSDS and b) (hexylamino methylene, amino methylene) phosphinic acid, ($C_8H_{20}N_2O_2P$), and/or its salts wherein the NOSDS is comprised of one or more solvents selected from the group consisting of aprotic organo solvents and protic organo solvents wherein one or more aprotic organo solvents are selected from the group consisting of:

a) dimethyl sulfoxide, b) and one or more sulfoxide(s) selected from the group consisting of dialkyl, diaryl, or alkylaryl sulfoxide(s) selected from the formula structure:

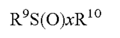

wherein i) $R^9$ and $R^{10}$ are each independently a $C_1$-$C_6$alkylene group, an aryl group or $C_1$-$C_3$ alkylenearyl group, ii) or $R^9$ and $R^{10}$ with the sulfur to which they are attached form a 4 to 8 membered ring wherein $R^9$ and $R^{10}$ together are a $C_1$-$C_6$alkylene group which optionally contains one or more atoms selected from the group consisting of O, S, Se, Te, N, and P in the ring, iii) and x is 1 or 2, c) one or more alkylene carbonates selected from the group consisting of ethylene carbonate, propylene carbonate and butylene carbonate, d) one or more polyols capped with acetate or formate wherein the polyol portion is selected from the group consisting of ethylene glycol, 1,3 propylene glycol, 1,2 propylene glycol, butylene glycol, trimethylol propane, trimethylol ethane, pentaerythritol, sorbitol and sorbitan, glucose, fructose, galactose and glycerin, e) one or more alkylene glycol alkyl ethers acetates selected from the group consisting of dipropylene glycol methyl ether acetate, tripropylene glycol methyl ether acetate, and tripropylene glycol butyl ether acetate, f) one or more diesters selected from the group consisting of dimethylsuccinate, dimethyl adipate, diethyl glutarate, and dimethyl glutarate, g) one or more alkyl pryrrolidone selected from the group consisting of 1-Methyl-2-pyrrolidone and cyclohexylpyrrolidone, h) one or more members selected from the group consisting of dimethylacetamide, dimethylformamide, dimethyl-2-imidazolidinone, isophorone, hexamethylphosphoramide, 1,2-dimethyloxyethane, 2-methoxyethyl ether and limonene, i) one or more trialkyl phosphates selected from the group consisting of triethyl phosphate and tributyl phosphate, wherein said protic solvents are one or more members selected from the group consisting of:

a. one or more alcohols selected from the group consisting of the family of $C_1$-$C_{10}$ alkanols, b. one or more polyols selected from the group consisting of trimethylol propane, trimethylol ethane, pentaerythritol, sorbitol and sorbitan, glucose, fructose, galactose, and glycerin, c. one or more polyalkylene glycols one or more members selected from the group consisting of poly($C_1$-$C_{10}$ alkylene) glycols, d. isopropylidene glycerol, e. one or more alkylene glycol alkyl of the formula:

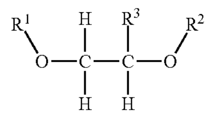

wherein i) $R^1$ is one or more members selected from the group consisting of $CH_3$, $C_2H_5$, $C_3H_7$ and $C_4H_9$, ii) $R^2$ is one or more members selected from the group consisting of H and the formula structure:

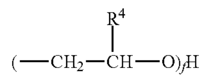

wherein (1) $R^4$ is one or more members selected from the group consisting of H and $CH_3$, (2) and f is an integer between 1 and 15, iii) wherein $R^3$ is one or more members selected from the group consisting of H and $CH_3$, f. one or more alkyl lactates selected from the group consisting of ethyl, propyl and butyl lactate, g. one or more alkanolamines selected from the group consisting of alkanolamines of the structure:

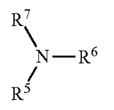

wherein iv) $R^5$ is one or more members selected from the group consisting of $C_2H_4OR^8$ and $C_3H_6OH$, v) $R^6$ is: H, $C_2H_4OR^8$ and $C_3H_6OH$, vi) $R^7$ is one or more members selected from the group consisting of H, $C_2H_4OR^8$ and $C_3H_6OH$, wherein (1) $R^8$ is $(C_2H_4O)_gH$, wherein g is an integer between 1-10, j) and glycerol carbonate, and wherein said liquid formulation(s) have shown that they are extremely effective urease inhibitors, coat urea effectively, and coat DCD effectively.

In an embodiment, a method to make amino methylene phosphinic acids and or their salts comprises one or more steps comprising:

1) charging hypophosphorous acid/50% water. In a variation, the water is displaced with an aprotic NOSDS. In a variation the water is removed. In another variation, the water is removed through the use of temperatures of 70-90° C. In another variation, the water is removed through the use of temperatures of 70-90° C. and by reducing the pressure of the reaction vessel,
2) agitating the contents of the reaction vessel and charging dimethyl sulfoxide and then paraformaldehyde while removing the heat thereby generated by the reaction. In a variation, trioxane is substituted for paraformaldehyde. In another variation, a formaldehyde solution is substituted for paraformaldehyde. In another variation, a mixture of one or more formaldehyde variants is charged to the reactor vessel,
3) heating the composition to 50-80° C. and holding at 50-80° C. until the composition clears,
4) cooling the temperature to 25-30° C. and then charging hexylamine slowly while cooling on the reactor vessel in order to maintain the temperature <40° C. In a variation, the reactor vessel is not cooled. In another variation, the hexylamine is charged slowly to the reaction vessel with no cooling,
5) after completing the hexylamine charge, the temperature is raised to 50-70° C. and then held until composition's appearance becomes clear,
6) charging sub-surface of ammonia gas,
7) continuing the $NH_3$ sparge at a temperature of 50-70° C. until the composition's 10% pH reaches 6-10. In a variation, the 10% pH reaches 7-9. In another variation, the pH reaches 7.5-8.5,
8) heating the composition to 80-100° C. while maintaining the composition's 10% pH of 6-10. In a variation, the 10% pH is 7-9. In another variation, the pH reaches 7.5-8.5 by adjusting the pH through ammonia sparging,
9) holding at 80-100° C. for one hour while maintaining 10% pH of 6-10. In a variation, maintaining 10% pH of 7-9. In another variation, maintaining 10% pH of 7.5-8.5 pH through ammonia sparging,
10) reducing the reaction vessel's pressure. In a variation, the reaction vessel pressure is reduced through application of a vacuum. In a variation, the reaction vessel pressure is reduced to a pressure reading of ≤200 mm Hg. In a variation, the reaction vessel pressure is reduced to a pressure reading of ≤100 mm Hg. In a variation, the reaction vessel pressure is reduced to a pressure reading of 60-100 mm Hg. In a variation, the reaction vessel pressure is reduced to a pressure reading of 40-60 mm Hg. In a variation, the reaction vessel pressure is reduced to a pressure reading of 20-40 mm Hg. In another variation, the reaction vessel pressure is reduced to a pressure reading of <20 mm Hg,
11) Vacuum is maintained until distillation ceases and % moisture is less than 30%. In a variation, the % moisture is less than 20%. In a variation, the % moisture is less than 10%. In a variation, the % moisture is less than 5%. In another variation, the moisture is less than 1%.

In an embodiment (aminomethylene)phosphinic acids and bis-(aminomethylene)phosphinic acids have improved urease inhibition performance. In a variation and not to be bound by theory, (aminomethylene)phosphinic acids and bis-(aminomethylene)phosphinic acids are more hydrolytically and thermally stable versus the traditional phosphoric triamides.

In an embodiment, fertilizer compositions are comprised of a) one or more members selected from the group consisting of (aminomethylene)phosphinic acids and bis-(aminomethylene)phosphinic acids, b) NOSDS, c) nitrogen sources wherein one or more nitrogen sources are selected from the group consisting of: urea (molten/solid), manure, compost, urea formaldehyde reaction products (molten/solid), urea/ammonia/formaldehyde reaction products (molten/solid), ammonium sulfate, anhydrous ammonia, urea/ammonium nitrate aqueous solutions (UAN) and other urea aqueous solutions.

In an embodiment, a method to make a fertilizer composition comprises making a composition with a) one or more member selected from the group consisting of (aminomethylene)phosphinic acids and bis-(aminomethylene)phosphinic acids and b) molten urea.

In an embodiment, fertilizer compositions are comprised of a) one or more member selected from the group consisting of (aminomethylene)phosphinic acids and bis-(aminomethylene)phosphinic acids, b) NOSDS, c) nitrogen sources and d) water wherein one or more nitrogen sources are selected from the group consisting of: urea (molten/solid), manure, compost, urea formaldehyde reaction products (molten/solid), urea/ammonia/formaldehyde reaction products (molten/solid), ammonium sulfate, anhydrous ammonia, urea/ammonium nitrate aqueous solutions (UAN) and other urea aqueous solutions.

In an embodiment, the improved urease inhibition properties of (aminomethylene)phosphinic acids and bis-(aminomethylene)phosphinic acids applied as a coating on a nitrification inhibitor results in a flowable, dry powder for application to manure.

The following references are incorporated by reference in their entireties.

U.S. Pat. No. 4,234,332 to Michaud

U.S. Pat. No. 5,024,689 to Sutton et al.

U.S. Pat. No. 5,352,265 to Weston, et al

U.S. Pat. No. 5,698,003 to Omilinsky, et

U.S. Pat. Application Publication No 20140090432, No 20150143860, No 20150299062 and No 20150315092/McKnight U.S. Pat. No. 9,266,789 to Ortiz-Suarez U.S. Pat. No. 8,562,711, U.S. Pat. Application Publication No 2007157689 and No 20130283873 to Sutton It is contemplated and therefore within the scope of the present invention that any feature that is described above can be combined with any other feature that is described above. When mixtures, formulations and/or compositions are discussed, it should be understood that those mixtures, formulations and/or compositions are contemplated as being parts of bigger mixtures, formulations and/or compositions including having solvating agents. Moreover, it should be understood that the present invention contemplates minor modifications that can be made to the compositions and methods of the present invention. In any event, the present invention is defined by the below claims.

The invention claimed is:

1. A dry, flowable additive composition adapted for combination with a fertilizer to increase longevity of plant available nitrogen in the soil from the fertilizer, the dry, flowable additive composition comprising:

a) a powder or granular dicyandiamide (DCD) comprising 80-99% of the dry flowable additive composition, the powder or granular DCD is a core of the dry, flowable additive composition that is evenly coated with b) a coating formulation comprising N-(n-butyl)thiophosphoric triamide (NBPT) as a urease inhibitor solubilized within dimethyl sulfoxide (DMSO), the NBPT comprises 80-90 wt % of the coating formulation.

2. The dry, flowable additive composition of claim 1, wherein the coating formulation is a fluid liquid solution at 60-70° C.

3. The dry, flowable additive composition of claim 1, wherein the coating formulation delivers an even coating of NBPT onto surfaces of the powder or granular DCD.

4. The dry, flowable additive composition of claim 1, wherein the coating formulation delivers an even coating of NBPT onto surfaces of the powder or granular DCD when heated to 60-70° C. while avoiding clumping of the granules or powder.

5. The dry, flowable additive composition of claim 1, wherein the composition further comprises one or more members selected from the group consisting of a) surfactants, b) buffers, c) fragrance/odor masking agents, d) colorants, e) micro-nutrients, f) dispersed nitrification inhibitors and e) flow modifiers.

6. The dry, flowable additive composition of claim 1, wherein the composition further comprises one or more additional aprotic solvents selected from the group consisting of a) one or more alkylene carbonates selected from the group consisting of (i) ethylene carbonate, ii) propylene carbonate, and iii) butylene carbonate;

b) one or more polyols capped with acetate or formate wherein the polyols are selected from the group consisting of i) ethylene glycol, ii) 1,3 propylene glycol, iii) 1,2 propylene glycol, iv) butylene glycol, v) trimethylol propane, vi) trimethylol ethane, vii) pentaerythritol, viii) sorbitol, ix) sorbitan, x) glucose, xi) fructose, xii) galactose, and xii) glycerin;

c) one or more alkylene glycol alkyl ethers acetates selected from the group consisting of i) dipropylene glycol methyl ether acetate, ii) tripropylene glycol methyl ether acetate, and iii) tripropylene glycol butyl ether acetate;

d) one or more diesters selected from the group consisting of i) dimethylsuccinate, ii) dimethyl adipate, iii) diethyl glutarate, and iv) dimethyl glutarate;

e) one or more alkyl pryrrolidones selected from the group consisting of 1-Methyl-2-pyrrolidone and cyclohexylpyrrolidone; and f) one or more members selected from the group consisting of i) dimethylacetamide, ii) dimethylformamide, iii) dimethyl-2-imidazolidinone, iv) isophorone, v) hexamethylphosphoramide, vi) 1,2-dimethyloxyethane, vii) 2-methoxyethyl ether, and viii) limonene, and i) one or more trialkyl phosphates selected from the group consisting of i) triethyl phosphate and tributyl phosphate.

7. The dry, flowable additive composition of claim 1, the composition further comprises one or more protic solvents selected from the group consisting of a) one or more alcohols selected from the group consisting of $C_1$-$C_{10}$ alkanols, b) one or more polyols selected from the group consisting of i) trimethylol propane, ii) trimethylol ethane, iii) pentaerythritol, iv) sorbitol, v) sorbitan, vi) glucose, vii) fructose, viii) galactose, and ix) glycerin, c) one or more polyalkylene glycols selected from the group consisting of poly($C_1$-$C_{10}$ alkylene) glycols, d) isopropylidene glycerol, e) one or more alkylene glycol alkyl ethers selected from the formula structure:

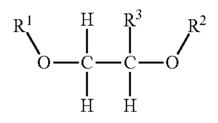

wherein i) $R^1$ is $CH_3$, $C_2H_5$, $C_3H_7$, or $C_4H_9$, ii) $R^2$ is H or,

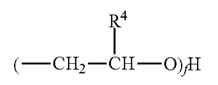

wherein (a) $R^4$ is H or $CH_3$, (b) f is an integer between 1 and 15, and (iii) $R^3$ is of H or $CH_3$, f) one or more alkyl lactates selected from the group consisting of i) ethyl lactate, ii) propyl lactate and iii) butyl lactate, g) one or more alkanolamines selected from the formula

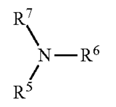

i. $R^5$ is $C_2H_4OR^8$ or $C_3H_6OH$, ii. $R^6$ is H, $C_2H_4OR^8$, or $C_3H_6OH$, iii. $R^7$ is H, $C_2H_4OR^8$, or $C_3H_6OH$, wherein (1) $R^8$ is $(C_2H_4O)_gH$ Wherein g is an integer between 1-10, h) and glycerol carbonate.

8. The dry, flowable additive composition of claim 1, wherein the composition is produced by a method comprising a) preparing said coating formulation by making a liquid mixture or a solution including the NBPT in the DMSO at temperatures 60-70° C., b) in a separated vessel, placing the powder or granular DCD under agitation at 60-70° C., c) slowly adding said coating formulation to the powder or granular DCD while mixing until said coating formulation has evenly coated the powder or granular DCD, and d) optionally adding a flow modifier to improve handling properties of said dry, flowable additive.

9. The dry, flowable additive composition of claim 8, wherein said coating formulation further comprises a colorant to provide visual conformation that said NBPT have been delivered to the surface of said powder or granular DCD in a smooth, even coating.

10. The dry, flowable additive composition of claim 1, wherein said coating formulation further comprises a colorant to provide visual confirmation that the NBPT has been applied on the surface of the powder or granular DCD.

11. The dry, flowable additive composition of claim 1, wherein the dry, flowable additive composition comprises 18-0.5% NBPT and 10-0.2% DMSO.

12. The dry, flowable additive composition of claim 1, wherein the dry, flowable additive composition is adapted for combination with a fertilizer to increase longevity of plant available nitrogen in the soil from the fertilizer.

13. The dry, flowable additive composition of claim 12, wherein the fertilizer is a manure.

14. The dry, flowable additive composition of claim 13, wherein 0.1-10% of said dry, flowable additive is dissolved in water and added to the manure as an aqueous solution.

15. A fertilizer made by the process of:

(a) providing a urea source comprising nitrogen to promote plant growth;

(b) providing the dry, flowable additive of claim 1;

(c) dissolving the dry, flowable additive of step (b) in water to form a dissolved additive solution including the powder or granular DCD and NBPT; and (d) applying the dissolved additive solution of step (c) to the urea source to form the fertilizer and/or mixing the dissolved additive solution of step (c) with the urea source to form the fertilizer.

16. The fertilizer of claim 15, wherein the urea source is solid or liquid.

17. The fertilizer of claim 16, wherein the urea source is manure.

18. The fertilizer of claim 15, wherein the dry flowable additive further comprises a) 2-chloro-6-trichloromethyl) pyridine, b) 4-amino-1,2,4-triazole-HCl, c) 2,4-diamino-6-trichloromethyltriazine CL-1580, thiourea, e) 1-mercapto-1,2,4-triazole, f) ammonium thiosulfate, g) dimethylpyrazole organic and inorganic salts and/or h) 2-amino-4-chloro-6-methylpyrimidine.

19. The fertilizer of claim 17, wherein the dry flowable additive further comprises a) 2-chloro-6-trichloromethyl) pyridine, b) 4-amino-1,2,4-triazole-HCl, c) 2,4-diamino-6-trichloromethyltriazine CL-1580, d) thiourea, e) 1-mercapto-1,2,4-triazole, f) ammonium thiosulfate, g) dimethylpyrazole organic and inorganic salts and/or h) 2-amino-4-chloro-6-methylpyrimidine.

* * * * *